(12) United States Patent
Ai et al.

(10) Patent No.: US 12,199,703 B2
(45) Date of Patent: Jan. 14, 2025

(54) SECTOR-SPLITTING MULTI-BEAM BASE STATION ANTENNAS HAVING MULTIPLE BEAMFORMING NETWORKS PER POLARIZATION

(71) Applicant: Outdoor Wireless Networks LLC, Claremont, NC (US)

(72) Inventors: Xiangyang Ai, Plano, TX (US); Chengcheng Tang, Murphy, TX (US); Peter J. Bisiules, LaGrange Park, IL (US); Kumara Swamy Kasani, Godavarikhani (IN)

(73) Assignee: Outdoor Wireless Networks LLC, Claremont, NC (US)

( * ) Notice: Subject to any disclaimer, the term of this patent is extended or adjusted under 35 U.S.C. 154(b) by 142 days.

(21) Appl. No.: 18/071,779

(22) Filed: Nov. 30, 2022

(65) Prior Publication Data
US 2023/0170944 A1    Jun. 1, 2023

Related U.S. Application Data

(60) Provisional application No. 63/284,658, filed on Dec. 1, 2021.

(51) Int. Cl.
*H04B 7/0408* (2017.01)
*H04B 7/06* (2006.01)
(Continued)

(52) U.S. Cl.
CPC ......... *H04B 7/0408* (2013.01); *H04B 7/0617* (2013.01); *H04W 16/28* (2013.01); *H01Q 3/40* (2013.01); *H04W 88/08* (2013.01)

(58) Field of Classification Search
CPC ...... H01Q 1/246; H01Q 21/061; H01Q 21/26; H01Q 3/40; H04B 7/0408; H04B 7/0617; H04B 7/10; H04W 16/28; H04W 88/08
See application file for complete search history.

(56) References Cited

U.S. PATENT DOCUMENTS

| | | | |
|---|---|---|---|
| 2015/0365141 A1* | 12/2015 | Derneryd | H04B 7/0408 455/63.4 |
| 2020/0044345 A1* | 2/2020 | Zimmerman | H04W 16/28 |
| 2020/0328787 A1 | 10/2020 | Wang et al. | |

OTHER PUBLICATIONS

"Invitation to Pay Additional Fees and, Where Applicable, Protest Fee, for corresponding Application No. PCT/US2022/080552, dated Mar. 6, 2023, 18 pages".
(Continued)

*Primary Examiner* — David S Huang
(74) *Attorney, Agent, or Firm* — Myers Bigel, P.A.

(57) ABSTRACT

A sector-splitting base station antenna includes a plurality of RF ports, a plurality of columns of radiating elements, a first beamforming network that is coupled between a first subset of the RF ports and a first antenna array that comprises a first subset of the columns of radiating elements, and a second beamforming network that is coupled between a second subset of the RF ports and a second antenna array that comprises a second subset of the columns of radiating elements. The first beamforming network and the first antenna array are configured to generate a first plurality of antenna beams that provide coverage to a first side of a sector of a cell of a cellular communications system but not to a second side of the sector, and the second beamforming network and the second antenna array are configured to generate a second plurality of antenna beams that provide coverage to the second side of the sector but not to the first side of the sector.

21 Claims, 15 Drawing Sheets

(51) Int. Cl.
  *H04W 16/28*  (2009.01)
  *H01Q 3/40*  (2006.01)
  *H04W 88/08*  (2009.01)

(56) References Cited

OTHER PUBLICATIONS

"International Search Report and Written Opinion for International Application No. PCTUS22080552 dated Apr. 28, 2023, 24 pages".

* cited by examiner

SECTOR-SPLITTING MULTI-BEAM BASE STATION ANTENNAS HAVING MULTIPLE BEAMFORMING NETWORKS PER POLARIZATION

CROSS-REFERENCE TO RELATED APPLICATION

The present application claims priority under 35 U.S.C. § 119 to U.S. Provisional Patent Application Ser. No. 63/284,658, filed Dec. 1, 2021, the entire content of which is incorporated herein by reference.

FIELD OF THE INVENTION

The present invention generally relates to radio communications and, more particularly, to sector-splitting base station antennas that generate multiple antenna beams.

BACKGROUND

Cellular communications systems are well known in the art. In a typical cellular communications system, a geographic area is divided into a series of regions that are referred to as "cells," and each cell is served by a base station. The base station may include baseband equipment, radios and base station antennas that are configured to provide two-way radio frequency ("RF") communications with subscribers that are positioned throughout the cell. In many cases, the cell may be divided into a plurality of "sectors," and separate base station antennas provide coverage to each of the sectors. Typically, a base station antenna includes one or more phase-controlled arrays of radiating elements. The antennas are often mounted on a tower or other raised structure, with the radiation beam ("antenna beam") that is generated by each antenna array directed outwardly to serve a respective sector.

A common base station configuration is a "three sector" configuration in which the cell is divided into three 120° sectors in the azimuth plane, and the base station includes three base station antennas that provide coverage to the three respective sectors. The azimuth plane refers to a horizontal plane that bisects the base station antenna and that is parallel to the plane defined by the horizon. In a three sector configuration, the antenna beams generated by each base station antenna typically have a Half Power Beam Width ("HPBW") in the azimuth plane of about 65° so that the antenna beams provide coverage throughout a 120° sector. Typically, each base station antenna will include a vertically-extending column of radiating elements that is typically referred to as a "linear array." Each radiating element in the linear array may have a HPBW of approximately 65° so that the antenna beam generated by the linear array will provide coverage to a 120° sector in the azimuth plane. In many cases, the base station antenna may be a so-called "multi-band" antenna that includes different arrays of radiating elements that operate in different frequency bands.

While most cells in a cellular communications system are designed to have three 120° sectors in the azimuth plane, with a separate base station antenna provided for each sector, cells can be divided into more than three sectors. For example, in certain situations cells may be divided into four, six, nine, ten, twelve, fifteen or eighteen sectors in the azimuth plane. Typically, so-called "sector-splitting" antennas are used when cells are expanded beyond four sectors. A sector-splitting antenna refers to a base station antenna that generates multiple antenna beams that have narrowed beamwidths in the azimuth plane (i.e., HPBWs of less than about 65°), where the pointing directions of the multiple antenna beams are designed to split a sector into a plurality of sub-sectors. For example, a six-sector base station will have six 60° sectors in the azimuth plane, and will typically be served by three base station antennas that each provide coverage to a 120° sector in the azimuth plane. Each base station antenna is a "twin-beam" antenna that is designed to generate two antenna beams (at each polarization if dual polarized radiating elements are used) that each have a reduced size in the azimuth plane (typically about half the size of a normal sector antenna beam) and that each point in different directions in the azimuth plane (typically about −30° and 30° from the center of the 120° sector served by the antenna), thereby splitting the sector into two smaller sub-sectors.

As noted above, sector-splitting base station antennas generate multiple antenna beams that have narrowed beamwidths in the azimuth plane. In order to generate these narrowed antenna beams, multiple columns of radiating elements (typically 3-4 columns for a twin-beam antenna) are mounted on a reflector. Transmitting RF signals through multiple columns of radiating elements acts to expand the aperture of the antenna in the azimuth plane, which shrinks the azimuth beamwidth of the generated antenna beams. While separate multi-column arrays of radiating elements may be provided to generate each antenna beam, this approach may significantly increase the width of the base station antenna, which is often commercially unacceptable due to zoning regulations, wind loading constraints or the like. Thus, beamforming networks such as a Butler Matrix are often used, which allow two or more RF signals to be transmitted through the same multi-column array of radiating elements to generate two or more corresponding antenna beams that point in different directions.

For example, twin-beam sector-splitting antennas are well known in the art that include two RF ports (per polarization) that are coupled to a multi-column array of radiating elements through a beamforming network such as a Butler Matrix. The beamforming network generates two separate antenna beams (per polarization) based on the RF signals input at the two RF ports, and the antenna beams are electrically steered away from the boresight pointing direction of the antenna at angles of about −30° and 30° to provide coverage to the two sub-sectors. With beamforming network based twin beam antennas, the pointing angle in the azimuth plane of each antenna beam and the HPBW of each antenna beam may vary as a function of the frequency of the RF signals input at the two RF ports. In particular, the azimuth pointing direction of the antenna beams (i.e., the azimuth angle where peak gain occurs) tends to move toward the boresight pointing direction of the antenna with increasing frequency. This phenomenon is sometimes referred to as "beam peak walking" since the location of the beam peak in the azimuth plane moves as a function of frequency. Beam peak walking will typically occur on all of the antenna beams generated by the twin beam antenna except for any antenna beam that has a beam peak at the boresight pointing direction of the antenna.

SUMMARY

Pursuant to embodiments of the present invention, sector-splitting base station antennas are provided that include a plurality of RF ports, a plurality of columns of radiating elements, a first beamforming network that is coupled between a first subset of the RF ports and a first antenna array that comprises a first subset of the columns of radiating elements, and a second beamforming network that is coupled between a second subset of the RF ports and a second antenna array that comprises a second subset of the columns of radiating elements. The first beamforming network and the first antenna array are configured to generate a first plurality of antenna beams that provide coverage to a first side of a sector of a cell of a cellular communications system but not to a second side of the sector. The second beamforming network and the second antenna array are configured to generate a second plurality of antenna beams that provide coverage to the second side of the sector but not to the first side of the sector.

In some embodiments, none of the columns of radiating elements in the first subset of the columns of radiating elements are also in the second subset of the columns of radiating elements.

In some embodiments, some, but not all, of the columns of radiating elements in the first subset of the columns of radiating elements comprise shared columns of radiating elements that are also in the second subset of the columns of radiating elements.

The shared columns of radiating elements may be in between the columns of radiating elements in the first subset of the columns of radiating elements that are not in the second subset of the columns of radiating elements and the columns of radiating elements in the second subset of the columns of radiating elements that are not in the first subset of the columns of radiating elements.

In some embodiments, the first beamforming network may comprise a first Butler Matrix that has six inputs and six outputs and the second beamforming network may comprise a second Butler Matrix that has six inputs and six outputs. In some embodiments, at least some of the outputs of the first Butler Matrix may be coupled to more than one of the columns of radiating elements. In other embodiments, the outputs of the first Butler Matrix may be coupled to first through tenth of the columns of radiating elements and the outputs of the second Butler Matrix may be coupled to eleventh through twentieth of the columns of radiating elements.

In some embodiments, at least two of the columns of radiating elements in the second subset of the columns of radiating elements may be positioned within a footprint of the first antenna array.

In some embodiments, some, but not all, of the columns of radiating elements in the first subset of the columns of radiating elements may be interlaced with respective ones of the columns of radiating elements in the second subset of the columns of radiating elements. In some embodiments, each column of radiating elements in the first subset of the columns of radiating elements that is interlaced with a respective one of the columns in the second subset of the columns of radiating elements may be vertically aligned with the respective one of the columns in the second subset of the columns of radiating elements with which it is interlaced. In other embodiments, each column of radiating elements in the first subset of the columns of radiating elements that is interlaced with a respective one of the columns in the second subset of the columns of radiating elements may be horizontally staggered with the respective one of the columns in the second subset of the columns of radiating elements with which it is interlaced.

In some embodiments, the sector-splitting base station antenna may be configured to split the sector into a plurality of sub-sectors in the azimuth plane, and the first plurality of antenna beams provide coverage to a first half of the sub-sectors and the second plurality of antenna beams provide coverage to a second half of the sub-sectors that is different from the first half.

Pursuant to further embodiments of the present invention, sector-splitting base station antennas are provided that include a plurality of RF ports, a plurality of columns of radiating elements, a first beamforming network that includes a plurality of inputs and a plurality of outputs, and a second beamforming network that includes a plurality of inputs and a plurality of outputs. In these antennas, some of the inputs of the first beamforming network are coupled to respective ones of a first subset of the RF ports and a remainder of the inputs are coupled to respective matched terminations, and the outputs of the first beamforming network are coupled to a first subset of the columns of radiating elements.

In some embodiments, some of the inputs of the second beamforming network may be coupled to respective ones of a second subset of the RF ports and a remainder of the inputs may be coupled to respective matched terminations, and the outputs of the second beamforming network may be coupled to a second subset of the columns of radiating elements.

In some embodiments, each of the matched terminations may be a resistor that is coupled to electrical ground.

In some embodiments, the sector-splitting base station antenna may be configured to split a sector into six sub-sectors, and the first and second beamforming networks each have six inputs and six outputs.

In some embodiments, three of the six inputs of the first beamforming network a may be re coupled to first through third of the RF ports and the remaining three of the six inputs of the first beamforming network may be coupled to first through third of the matched terminations.

In some embodiments, some, but not all, of the columns of radiating elements in the first subset of the columns of radiating elements may be shared columns of radiating elements that are also in the second subset of the columns of radiating elements.

In some embodiments, the sector-splitting base station antenna may be configured to split a sector of a cell of a cellular communications system into a plurality of sub-sectors in the azimuth plane, and the first beamforming network may be configured to generate a first plurality of antenna beams that provide coverage to a first half of the sub-sectors that form a left side of the sector and the second beamforming network may be configured to generate a second plurality of antenna beams that provide coverage to a second half of the sub-sectors that form a right side of the sector.

Pursuant to still further embodiments of the present invention, sector-splitting base station antennas are provided that include a plurality of RF ports, a first antenna array that includes a plurality of first columns of radiating elements, a second antenna array that includes a plurality of second columns of radiating elements, a first beamforming network that is coupled between a first subset of the RF ports and the first antenna array, and a second beamforming network that is coupled between a second subset of the RF ports and the second antenna array. At least some of the first columns of radiating elements are within a footprint of the second antenna array, and at least some of the second columns of radiating elements are within a footprint of the second antenna array.

In some embodiments, the four rightmost of the first columns may be interlaced with the four leftmost of the second columns.

In some embodiments, each of the four rightmost of the first columns may be vertically aligned with a respective one of the four leftmost of the second columns.

In some embodiments, all of the first columns may be interlaced with respective ones of the second columns.

In some embodiments, each of the first columns may be vertically aligned with a respective one of the second columns.

In some embodiments, each of the first columns may be horizontally staggered with respect to the respective one of the second columns with which it is interlaced.

In some embodiments, none of the first columns of radiating elements may be part of the second antenna array, and none of the second columns of radiating elements may be part of the first antenna array.

In some embodiments, the first beamforming network may be a first Butler Matrix and the second beamforming network may be a second Butler Matrix that has six inputs and six outputs.

In some embodiments, at least some of the outputs of the first Butler Matrix may be coupled to more than one of the first columns of radiating elements, and at least some of the outputs of the second Butler Matrix may be coupled to more than one of the second columns of radiating elements.

In some embodiments, at least some of a plurality of inputs to the first Butler Matrix may be coupled to matched terminations, and at least some of a plurality of inputs to the second Butler Matrix may be coupled to matched terminations.

In some embodiments, the sector-splitting base station antenna may be configured to split a sector of a cell of a cellular communication system into a plurality of sub-sectors in the azimuth plane, and the first Butler Matrix and the first antenna array may be configured to generate a first plurality of antenna beams that provide coverage to a first half of the sub-sectors and the second Butler Matrix and the second antenna array may be configured to generate a second plurality of antenna beams that provide coverage to a remaining half of the sub-sectors.

Pursuant to additional embodiments of the present invention, sector-splitting base station antennas that are configured to split a sector into a plurality of sub-sectors are provided that include a plurality of RF ports, a plurality of columns of radiating elements, a first beamforming network that is coupled between a first subset of the RF ports and a first subset of the columns of radiating elements, and a second beamforming network that is coupled between a second subset of the RF ports and a second subset of the columns of radiating elements, where the first beamforming network is configured to generate a plurality of first polarization antenna beams that provide coverage to a first subset of the sub-sectors and the second beamforming network is configured to generate a plurality of first polarization antenna beams that provide coverage to a second subset of the sub-sectors.

In some embodiments, the first subset of the sub-sectors may be a first half of the sub-sectors and the second subset of the sectors may be the remainder of the sub-sectors.

In some embodiments, the first beamforming network may be configured to generate a plurality of second polarization antenna beams that provide coverage to the first subset of the sub-sectors and the second beamforming network may be configured to generate a plurality of second polarization antenna beams that provide coverage to the second subset of the sub-sectors.

In some embodiments, none of the columns of radiating elements in the first subset of the columns of radiating elements may also be in the second subset of the columns of radiating elements.

In some embodiments, some, but not all, of the columns of radiating elements in the first subset of the columns of radiating elements may be shared columns of radiating elements that are also in the second subset of the columns of radiating elements.

In some embodiments, the shared columns of radiating elements may be in between the columns of radiating elements in the first subset of the columns of radiating elements that are not in the second subset of the columns of radiating elements and the columns of radiating elements in the second subset of the columns of radiating elements that are not in the first subset of the columns of radiating elements.

In some embodiments, the first beamforming network may be a first Butler Matrix that has six inputs and six outputs and the second beamforming network may be a second Butler Matrix that has six inputs and six outputs.

In some embodiments, at least some of the outputs of the first Butler Matrix may be coupled to more than one of the columns of radiating elements.

In some embodiments, the outputs of the first Butler Matrix may be coupled to first through tenth of the columns of radiating elements and the outputs of the second Butler Matrix may be coupled to eleventh through twentieth of the columns of radiating elements.

In some embodiments, some, but not all, of the columns of radiating elements in the first subset of the columns of radiating elements may be interlaced with respective ones of the columns of radiating elements in the second subset of the columns of radiating elements. In some embodiments, each column of radiating elements in the first subset of the columns of radiating elements that is interlaced with a respective one of the columns in the second subset of the columns of radiating elements may be vertically aligned with the respective one of the columns in the second subset of the columns of radiating elements with which it is interlaced. In some embodiments, each column of radiating elements in the first subset of the columns of radiating elements that is interlaced with a respective one of the columns in the second subset of the columns of radiating elements may be horizontally staggered with the respective one of the columns in the second subset of the columns of radiating elements with which it is interlaced.

DETAILED DESCRIPTION

As discussed above, sector-splitting multi-beam antennas that use beamforming networks may exhibit beam peak walking where the pointing directions of the generated antenna beams vary as a function of frequency. Beam peak walking can be particularly problematic for antenna arrays that are designed to operate over wide frequency ranges, such as the 1.7-2.7 GHz frequency band. Beam peak walking can lead to a large variation in the power levels of the antenna beams at the outside edges of the sub-sectors as a function of frequency, which is undesirable. Moreover, the problems caused by beam peak walking tend to increase with the number of antenna beams generated by the sector-splitting antenna. In some cases, sector-splitting antennas may be designed to generate three, four, five, six or more antenna beams (per polarization) in order to, for example, split a 120° sector in the azimuth plane into three, four, five, six or more sub-sectors. Beam peak walking issues can be particularly problematic with such higher order sector-splitting antennas.

Figure 1A:
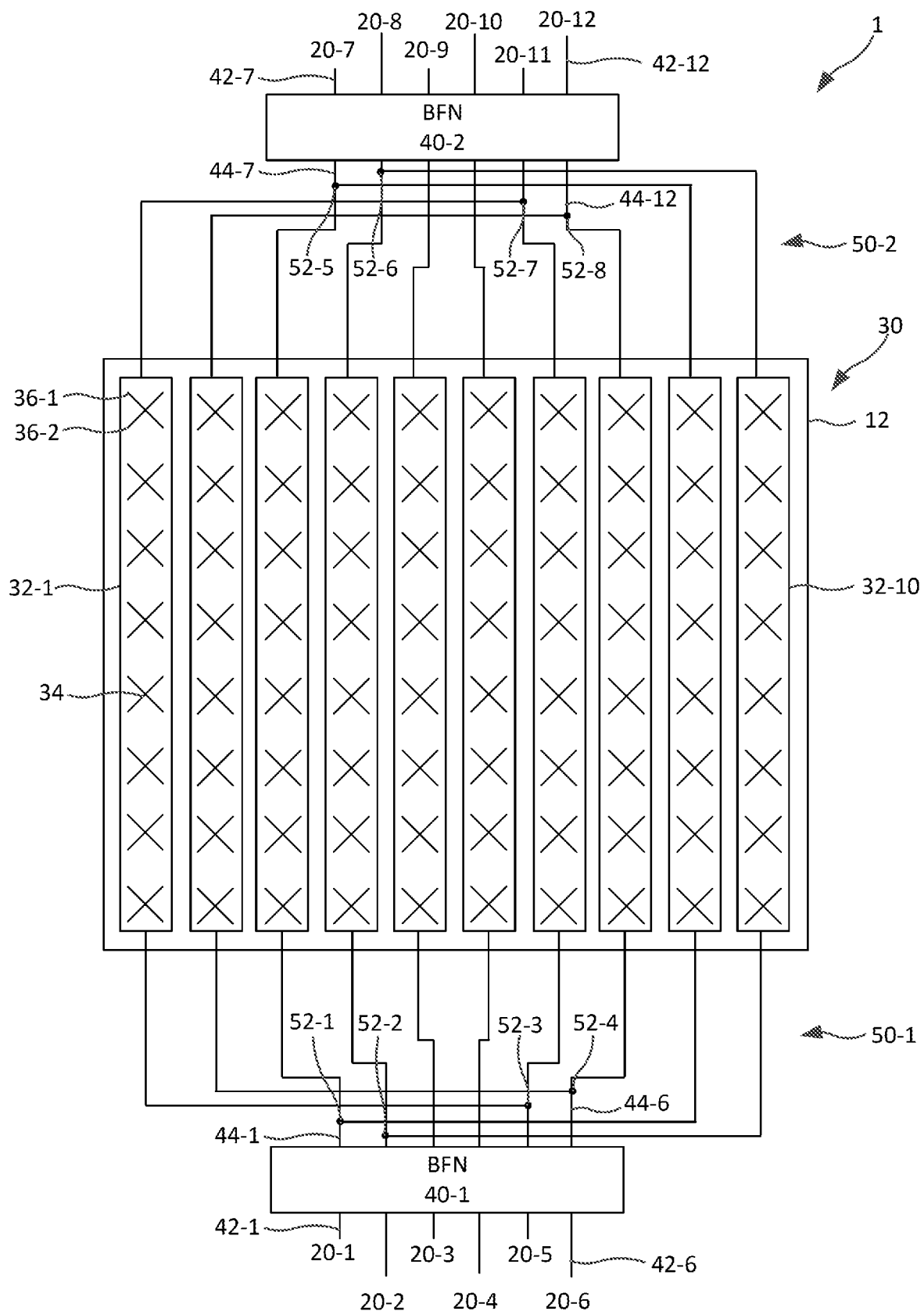
FIG. 1A is a schematic diagram of a conventional Butler Matrix based sector-splitting multi-beam base station antenna with the housing removed to show interior components of the antenna.
Figure 1B:
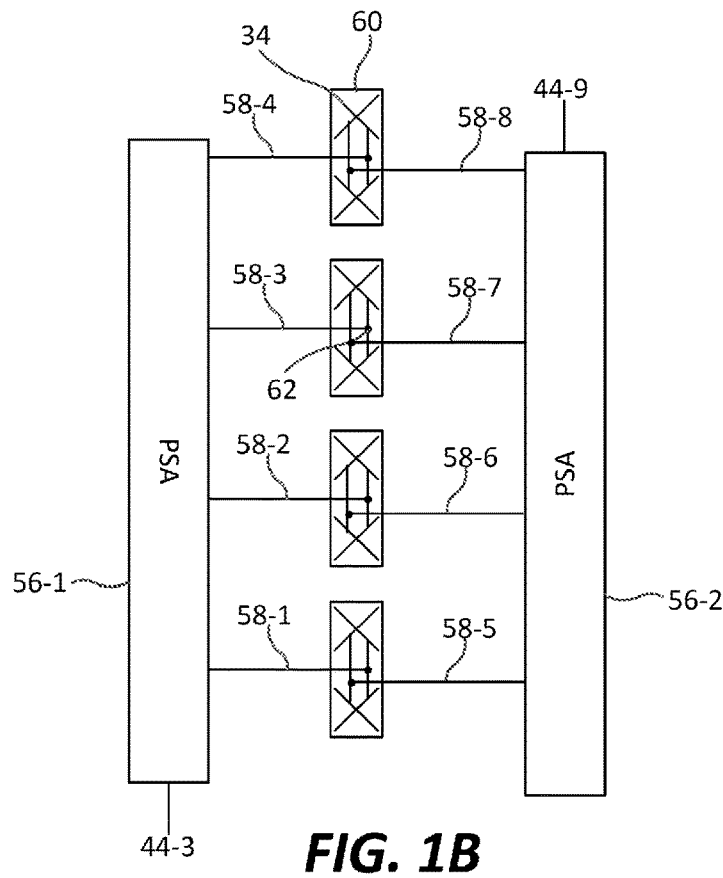
FIG. 1B is a block diagram illustrating how RF signals are distributed to the radiating elements in each column of radiating elements in FIG. 1A.

FIGS. 1A and 1B are schematic diagrams that together illustrate the RF signal paths of a conventional Butler Matrix based six-beam sector-splitting antenna 1. In particular, FIG. 1A is a schematic block diagram of base station antenna 1 that illustrates the RF signal paths extending from the RF ports of the antenna to the columns of a multi-column array of radiating elements, and FIG. 1B is a schematic block diagram illustrating how RF signals are distributed to the radiating elements in each column of the multi-column array.

As shown in FIG. 1A, the sector-splitting antenna 1 includes twelve RF connector ports 20-1 through 20-12 (also referred to herein as "RF ports") that are used to input RF signals to the antenna 1 from external radios, such as remote radio heads. The antenna 1 further includes an antenna array 30 that has ten columns 32-1 through 32-10 of dual-polarized radiating elements 34 that are mounted to extend forwardly from a reflector 12 (only columns 32-1 and 32-10 are explicitly numbered in FIG. 1A to simplify the drawing; it will be understood that the columns 32 are arranged sequentially in numerical order). Each dual-polarized radiating element 34 includes a first polarization radiator 36-1 and a second polarization radiator 36-2. Herein, when multiple of the same elements are included in an antenna, the elements may be referred to individually by their full reference numeral (e.g., column 32-3) and collectively by the first part of their reference numerals (e.g., the columns 32). Base station antenna 1 also includes a pair of beamforming networks ("BFN") 40-1, 40-2 (one for each polarization) and a pair of feed networks 50-1, 50-2 (again, one for each polarization). In order to simplify FIG. 1A, the beamforming networks 40-1, 40-2 and feed networks 50-1, 50-2 are illustrated as being on opposed ends of the antenna array 30. It will be appreciated that the RF connector ports 20-1 through 20-12 are typically all located in a bottom end cap (not shown) of antenna 1, that the beamforming networks 40 may be located in any convenient location within antenna 1, and the feed networks 50-1, 50-2 connect respective subsets of the RF ports 20 to the respective beamforming networks 40-1, 40-2.

The RF connector ports 20-1 through 20-6 may comprise, for example, RF connectors, and may be connected to RF ports on one or more radios via, for example, coaxial cables. The radios are typically external to the antenna 1 and are not shown in FIG. 1A. Each beamforming network 40 is implemented as a 6×6 Butler Matrix. The six first polarization RF connector ports 20-1 through 20-6 are connected to the six inputs 42-1 through 42-6 of the Butler Matrix 40-1, and the six second polarization RF connector ports 20-7 through 20-12 are connected to the six inputs 42-7 through 42-12 of the Butler Matrix 40-2. The six outputs 44-1 through 44-6 of Butler Matrix 40-1 are connected to the ten-column antenna array 30 by the feed network 50-1, and the six outputs 44-7 through 44-12 of Butler Matrix 40-2 are connected to the ten-column antenna array 30 by the feed network 50-2. Only inputs 42-1, 42-6, 42-7 and 42-12 and only outputs 44-1, 44-6, 44-7 and 44-12 are explicitly numbered in FIG. 1A to simplify the drawing; it will be understood that the inputs and outputs to the beamforming networks 40 are arranged sequentially in numerical order).

As is further shown in FIG. 1A, the feed network 50-1 includes four first-level power dividers 52-1 through 52-4 that are each used to connect selected ones of the outputs 44-1 through 44-6 of Butler Matrix 40-1 to respective pairs of columns 32 of antenna array 30. In particular, first-level power divider 52-1 connects output 44-1 of Butler Matrix 40-1 to the third and ninth columns 32-3 and 32-9, first-level power divider 52-2 connects output 44-2 of Butler Matrix 40-1 to the fourth and tenth columns 32-4 and 32-10, first-level power divider 52-3 connects output 44-5 of Butler Matrix 40-1 to the first and seventh columns 32-1 and 32-7, and first-level power divider 52-4 connects output 44-6 of Butler Matrix 40-1 to the second and eighth columns 32-2 and 32-8. Output 44-3 of Butler Matrix 40-1 is connected to the fifth column 32-5, and output 44-4 of Butler Matrix 40-1 is connected to the sixth column 32-6. Consequently, the six outputs 44-1 through 44-6 of Butler Matrix 40-1 feed all ten columns 32 of antenna array 30. An additional four first-level power dividers 52-5 through 52-8 are provided that connect selected ones of the outputs 44-7 through 44-12 of Butler Matrix 40-2 to respective pairs of columns 32 each of antenna array 30 in a similar fashion.

FIG. 1B illustrates the connections between beamforming networks 40-1, 40-2 and the radiating elements 34 of column 32-5 of antenna array 30. As shown in FIG. 1B, output 44-3 of Butler Matrix 40-1 is coupled to a first phase shifter assembly 56-1. The first phase shifter assembly 56-1 includes a 1×4 power divider that divides RF signals input thereto into four sub-components, and also includes an adjustable phase shifter that is configured to impart a phase progression across the four sub-components in order to electronically change the tilt angles of the antenna beams generated by the radiating elements 34 in column 32-5. Each output 58 of the first phase shifter assembly 56-1 is coupled to a respective feed board 60. A pair of radiating elements 34 are mounted on each feed board 60. A power divider 62 is provided on each feed board 60 that sub-divides RF signals input thereto from the respective outputs 58 of the first phase shifter assembly 56-1 into first and second sub-components that are passed to the respective first and second radiating elements 34 mounted on the feed board 60. As can be seen, the portion of feed network 50-1 depicted in FIG. 1B feeds output 44-3 of Butler Matrix 40-1 to the −45° dipole radiators 36-1 of the radiating elements 34 in column 32-5. A second phase shifter assembly 56-2 and four additional feed board power dividers 62 are provided that are used to similarly feed RF signals that are output from output 44-9 of Butler Matrix 40-2 to the +45° dipole radiators 36-2 of the radiating elements 34 in column 32-5. It will be appreciated that each of the other nine columns 32 of antenna array 30 are fed in the same manner as shown in FIG. 1B.

Figure 2A:
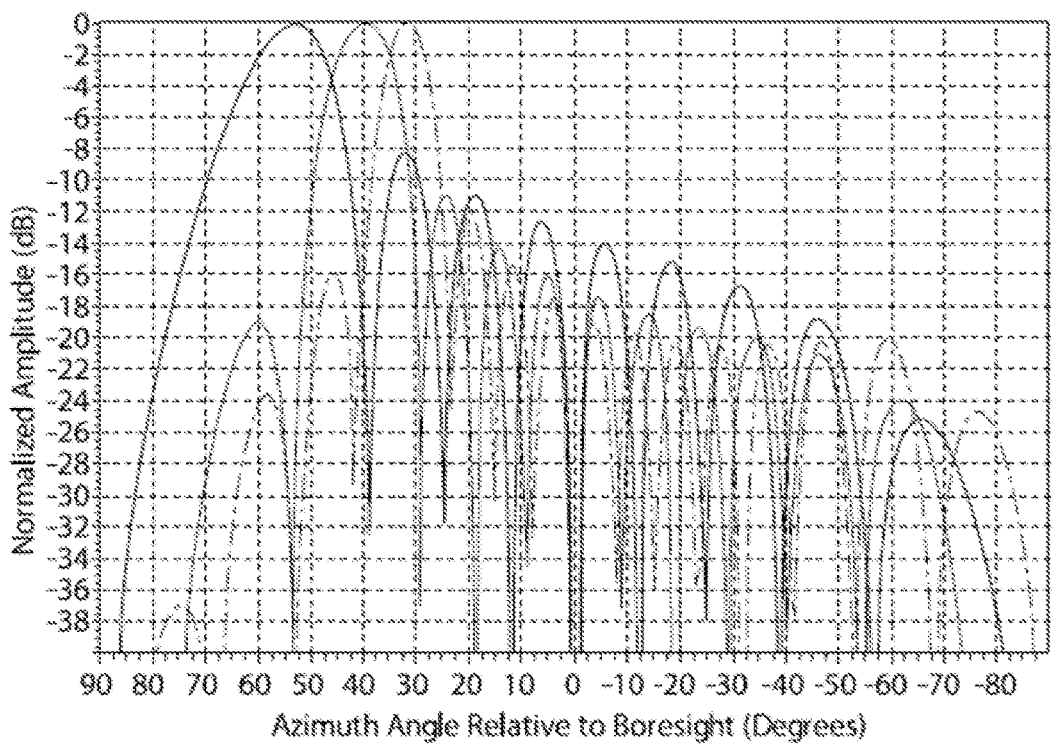
FIGS. 2A-2C are azimuth plots of the left three (of six) first polarization antenna beams generated by the conventional base station antenna of FIGS. 1A-1B when excited with RF signals at frequencies of 1.7 GHz, 2.2 GHz and 2.7 GHz that illustrate how the beam peak "walks" in the azimuth plane as a function of frequency.
Figure 2B:
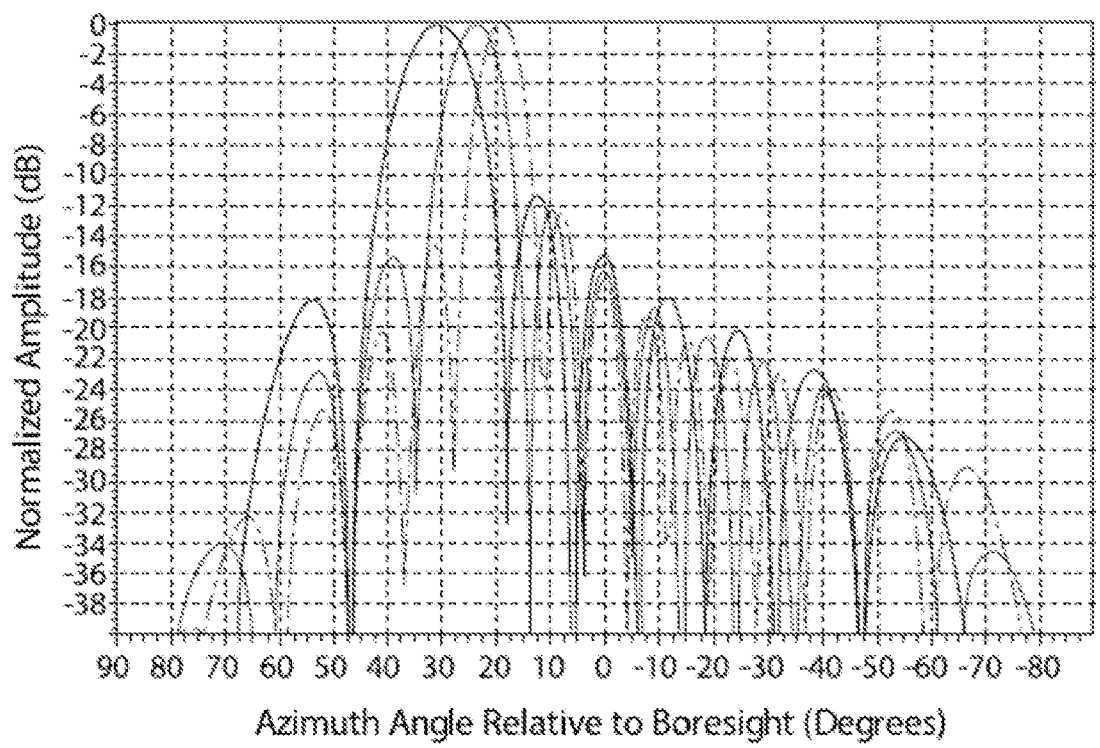
Figure 2C:
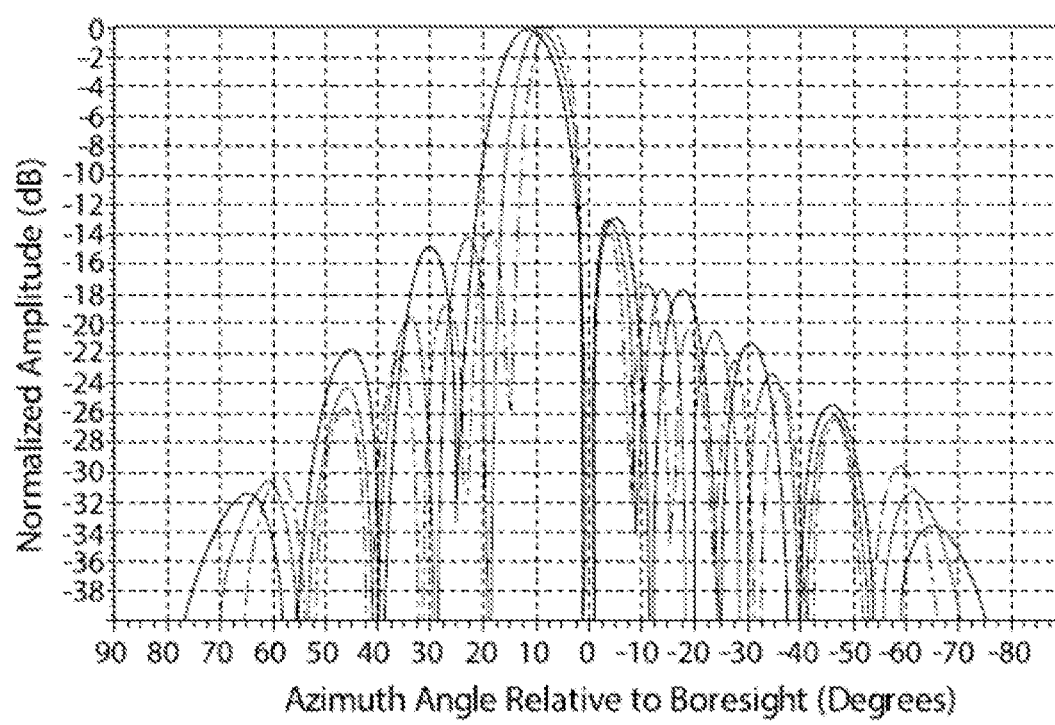

FIGS. 2A-2C are simulated azimuth plots that illustrate three of the six antenna beams generated by the multi-beam antenna 1 of FIGS. 1A-1B. Each graph shows the antenna beams that are generated by the antenna 1 when excited with RF signals at frequencies of 1.7 GHz, 2.2 GHz and 2.7 GHz (i.e., at the lowermost frequency, the center frequency and the uppermost frequency of the 1.7-2.7 GHz operating frequency band). FIG. 2A illustrates the leftmost antenna beam for a sector, FIG. 2B illustrates the antenna beam that is adjacent the antenna beam of FIG. 2A, and FIG. 2C illustrates the antenna beam that is adjacent the antenna beam of FIG. 2B. In other words, FIGS. 2A-2C illustrate the antenna beams that provide coverage to the left half of the sector. The remaining three antenna beams (at each of the three frequencies) that provide coverage to the right half of the sector are mirror images of the antenna beams shown in FIGS. 2A-2C. As shown in FIGS. 2A-2C, the beam peak walking increases with increasing scan angle, and exceeds 20° with the outermost antenna beams.

The beam peak walking shown in FIGS. 2A-2C occurs because the phase differences between the six outputs 44 of each Butler Matrix 40 are independent of the frequencies of the RF signals input to the Butler Matrix 40, but the spacing between the columns 32 of radiating elements 34 in array 30 is frequency dependent. It may be possible to reduce the degree of beam peak walking shown in FIGS. 2A-2C by applying a phase progression along the transmission lines connecting the outputs of the Butler Matrix 40 to the columns 32 of radiating elements 34. While this phase progression may designed to, for example, reduce the beam peak walking on the left three antenna beams, such a design will increase the beam peak walking for the right three antenna beams.

Pursuant to embodiments of the present invention, sector-splitting multi-beam antennas are provided that include first and second multi-column antenna arrays. These antennas further include a first beamforming network that is coupled to the first antenna array and a second beamforming network that is coupled to the second antenna array. The first beamforming network is configured to generate a first subset of the sector-splitting antenna beams, and the second beamforming network is configured to generate a second subset of the sector-splitting antenna beams. For example, for a six-beam sector-splitting antenna, the first beamforming network may be configured to generate the left three antenna beams and the second beamforming network may be configured to generate the right three antenna beams. A phase progression may be applied along the transmission lines connecting the outputs of each beamforming network to the columns of radiating elements in the respective antenna arrays. Since the first beamforming network is only used to generate the antenna beams that provide coverage to the left side of the sector, the added phase progression may reduce the degree of beam peak walking for the left side antenna beams without impacting the beam peak walking on the right side antenna beams. Similarly, since the second beamforming network is only used to generate the antenna beams that provide coverage to the right side of the sector, the added phase progression may reduce the degree of beam peak walking for the right side antenna beams without impacting the beam peak walking on the left side antenna beams.

In some embodiments, the sector-splitting base station antennas may include a plurality of RF ports, a plurality of columns of radiating elements, a first beamforming network that is coupled between a first subset of the RF ports and a first antenna array, and a second beamforming network that is coupled between a second subset of the RF ports and a second antenna array. The first beamforming network and the first antenna array are configured to generate a first plurality of antenna beams that provide coverage to a first side of a sector of a cell of a cellular communications system but not to a second side of the sector, and the second beamforming network and the second antenna array are configured to generate a second plurality of antenna beams that provide coverage to the second side of the sector but not to the first side of the sector.

In some embodiments, none of the columns of radiating elements in the first antenna array are also in the second antenna array. In other embodiments, some, but not all, of the columns of radiating elements in the first antenna array comprise shared columns of radiating elements that are also in the second antenna array. In such embodiments, the shared columns of radiating elements are in between the columns of radiating elements in the first antenna array that are not in the second antenna array and the columns of radiating elements in the second antenna array that are not in the first antenna array.

Each beamforming network may be implemented, for example, using a Butler Matrix. In some embodiments, at least some of the outputs of each Butler Matrix may be coupled to more than one of the columns of radiating elements. As a result, at least two of the columns of radiating elements in the second antenna array may be positioned within a footprint of the first antenna array.

The sector-splitting base station antenna may be configured to split the sector into a plurality of sub-sectors in the azimuth plane, and the first plurality of antenna beams provide coverage to a first half of the sub-sectors and the second plurality of antenna beams provide coverage to a second half of the sub-sectors that is different from the first half.

According to further embodiments, sector-splitting base station antennas are provided that have a plurality of RF ports, a plurality of columns of radiating elements, and first and second beamforming networks that each include a plurality of inputs and a plurality of outputs. Some of the inputs of the first beamforming network are coupled to respective ones of a first subset of the RF ports and a remainder of the inputs are coupled to respective matched terminations, and the outputs of the first beamforming network are coupled to a first subset of the columns of radiating elements.

Some of the inputs of the second beamforming network may be coupled to respective ones of a second subset of the RF ports and a remainder of the inputs are coupled to respective matched terminations (e.g., 50 ohm resistors), and the outputs of the first beamforming network are coupled to a second subset of the columns of radiating elements. The sector-splitting base station antenna may be configured, for example, to split a sector into six sub-sectors, and the first and second beamforming networks may each have six inputs and six outputs. Some, but not all, of the columns of radiating elements in the first subset of the columns of radiating elements may be shared columns of radiating elements that are also in the second subset of the columns of radiating elements in some embodiments.

Pursuant to further embodiments, sector-splitting base station antennas are provided that include a plurality of RF ports, first and second antenna arrays, a first beamforming network that is coupled between a first subset of the RF ports and the first antenna array and a second beamforming network that is coupled between a second subset of the RF ports and the second antenna array. At least some of the columns of radiating elements of the first antenna array are positioned within a footprint of the second antenna array, and at least some of the columns of radiating elements of the first antenna array are positioned within a footprint of the second antenna array.

In some embodiments, the four rightmost of the columns of the first antenna array are interlaced with the four leftmost of the columns of the second antenna array. In other embodiments, all of the columns of the first antenna array may be interlaced with columns of the second antenna array. The interlaced columns of the two antenna arrays may be vertically aligned in some embodiments, and horizontally staggered in other embodiments.

Pursuant to still further embodiments of the present invention, sector-splitting base station antennas are provided that are configured to split a sector into a plurality of sub-sectors. These antennas include a plurality of RF ports, a plurality of columns of radiating elements, a first beamforming network that is coupled between a first subset of the RF ports and a first subset of the columns of radiating elements, and a second beamforming network that is coupled between a second subset of the RF ports and a second subset of the columns of radiating elements. The first beamforming network is configured to generate a plurality of first polarization antenna beams that provide coverage to a first subset of the sub-sectors and the second beamforming network is configured to generate a plurality of first polarization antenna beams that provide coverage to a second subset of the sub-sectors.

Embodiments of the present invention will now be discussed in greater detail with reference to FIGS. 3A-12, in which example embodiments are shown.

Figure 3A:
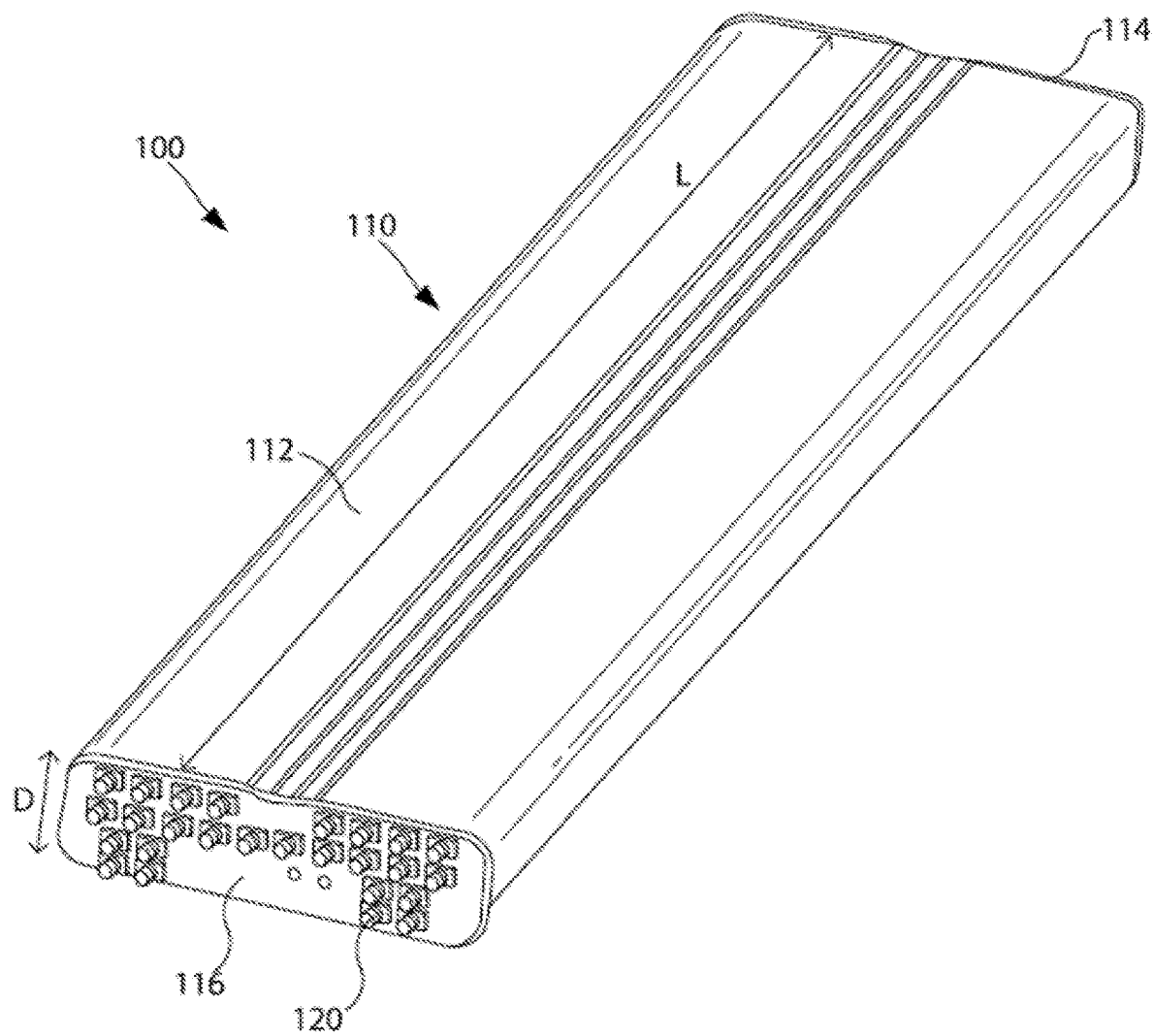
FIG. 3A is a perspective view of a sector-splitting multi-beam base station antenna according to embodiments of the present invention.
Figure 3B:
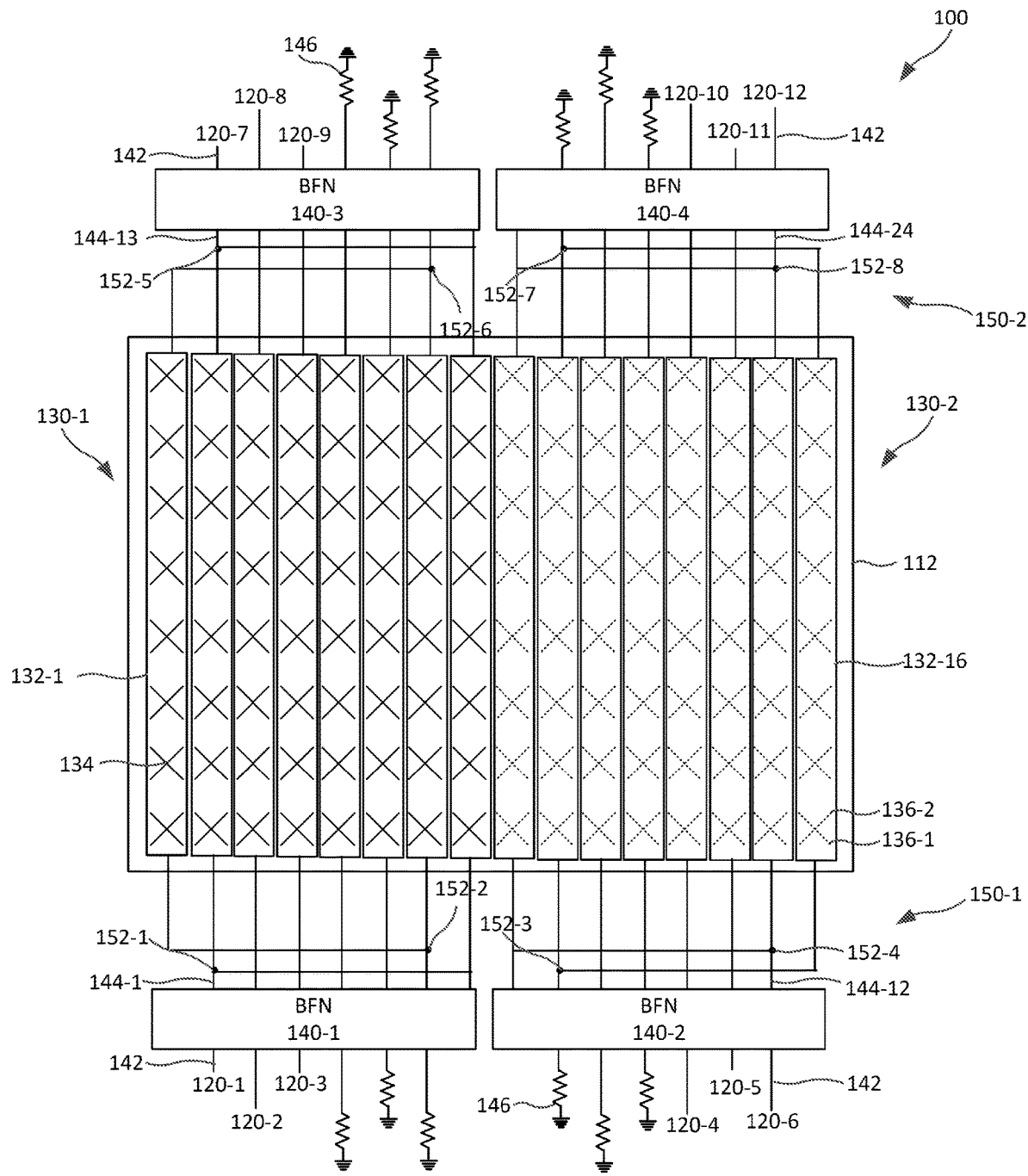
FIG. 3B is a schematic plan view of an antenna array and part of a feed network that are included in the base station antenna of FIG. 3A.
Figure 3C:
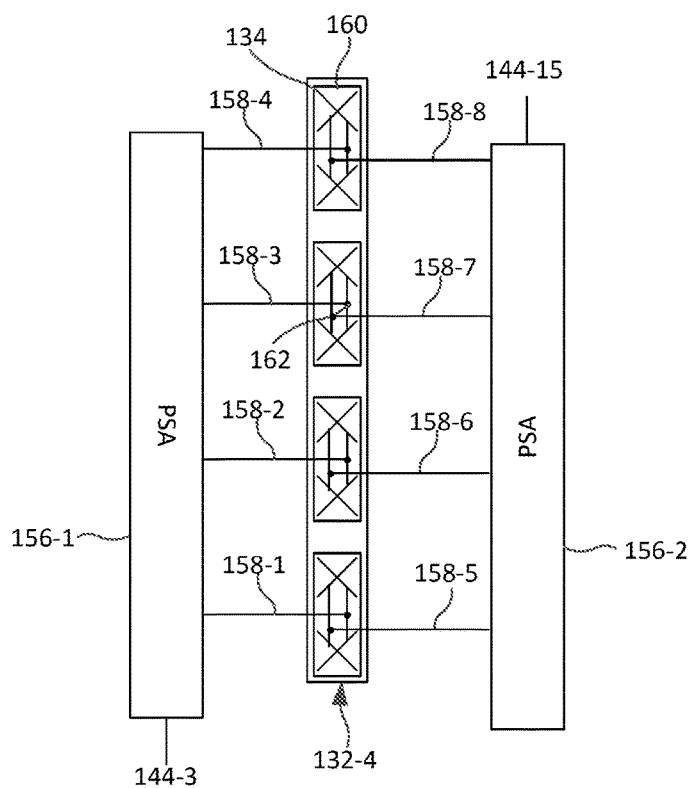
FIG. 3C is a schematic block diagram showing how the RF signals are distributed to the radiating elements of each column of the antenna array of FIG. 3B.
Figure 3D:
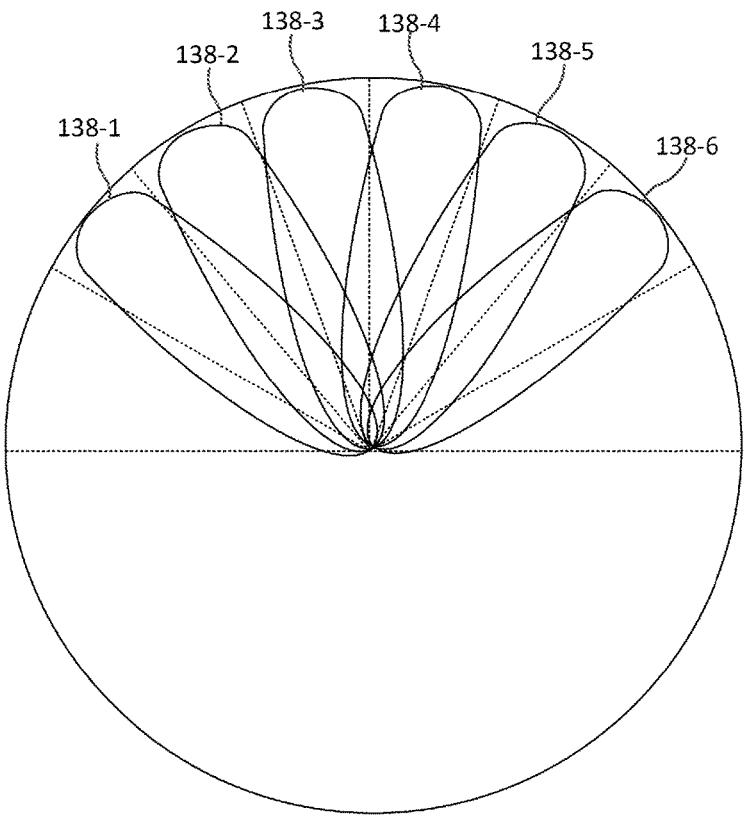
FIG. 3D is an azimuth plot illustrating the antenna beams generated by the sector-splitting multi-beam base station antenna of FIGS. 3A-3C.

FIGS. 3A-3D illustrate a sector-splitting multi-beam base station antenna 100 according to embodiments of the present invention. In particular, FIG. 3A is a perspective view of base station antenna 100. FIG. 3B is a schematic block diagram of antenna 100 that illustrates the RF signal paths extending from the RF ports of the antenna to the columns of the antenna arrays 130-1, 130-2 included therein, and FIG. 3C is a schematic block diagram illustrating how RF signals are distributed to the radiating elements in each column of radiating elements. FIG. 3D is an azimuth plot illustrating the antenna beams generated by the sector-splitting multi-beam base station antenna 100.

As shown in FIG. 3A, the sector-splitting multi-beam base station antenna 100 includes a housing 110. In the depicted embodiment, the housing 110 is a multi-piece housing that includes a radome 112, a top end cap 114 and a bottom end cap 116. A plurality of RF ports 120 are mounted in the bottom end cap 116. The RF ports 120 may comprise RF connectors that may receive coaxial cables that provide RF connections between the base station antenna 100 and one or more radios (not shown).

The base station antenna 100 is an elongated structure that extends along a longitudinal axis L. The azimuth boresight pointing direction of the base station antenna 100 refers to a horizontal axis extending from the front of base station antenna 100 to the center, in the azimuth plane, of a sector served by the base station antenna 100. When the base station antenna 100 is mounted for normal use, the longitudinal axis L will typically extend along a vertical axis, although in some cases the base station antenna 100 may be tilted a few degrees from the vertical to impart a mechanical downtilt to the antenna beams formed by the base station antenna 100.

Referring to FIG. 3B, the base station antenna 100 includes twelve RF connector ports 120-1 through 120-12 (also referred to herein as "RF ports") that are used to input RF signals to the antenna 100 from one or more external radios, such as remote radio heads. The RF connector ports 120 may comprise, for example, RF connectors. The antenna 100 further includes first and second antenna arrays 130-1, 130-2. The first antenna array 130-1 includes eight columns 132-1 through 132-8 of radiating elements 134, with eight radiating elements 134 in each column 132. Similarly, the second antenna array 130-2 includes eight columns 132-9 through 132-16 of radiating elements 134, with eight radiating elements 134 in each column 132. Each of the radiating elements 134 may be implemented as a dual-polarized radiating element 134, and each radiating element 134 may be mounted to extend forwardly from a reflector 112 (only columns 132-1 and 132-16 are explicitly numbered in FIG. 3B to simplify the drawing; it will be understood that the columns 132 are disposed in numerical order). In the illustrated embodiment, each radiating element 134 comprises a slant −45°/+45° cross-dipole radiating element that includes a first dipole radiator 136-1 that is configured to transmit and receive signals having a −45° polarization, and a second dipole radiator 136-2 that is configured to transmit and receive signals having a +45° polarization. The dipole radiators 136 may be mounted on a feed stalk (e.g., a pair of feedboard printed circuit boards that carry RF signals between the dipole radiators 136 and an associated feed network). As shown in FIG. 3B, the two antenna arrays 130-1, 130-2 are implemented in side-by-side fashion, and no radiating elements 134 of the first antenna array 130-1 are within the footprint of the second antenna array 130-2.

The antenna 100 also includes a total of four beamforming networks 140-1 through 140-4 (two for each polarization) and a pair of feed networks 150-1, 150-2 (one for each polarization). Each beamforming network 140 is implemented as a 6×6 Butler Matrix. RF connector ports 120-1 through 120-3 are connected to three of the six inputs 142 of Butler Matrix 140-1, and the remaining three inputs 142 to Butler Matrix 140-1 are each coupled to a matched termination such as, for example, a 50 Ohm resistor 146 that is coupled to electrical ground. RF connector ports 120-4 through 120-6 are connected to three of the six inputs 142 of Butler Matrix 140-2, and the remaining three inputs 142 to Butler Matrix 140-2 are each coupled to a matched termination 146. Four of the six outputs of Butler Matrix 140-1 (namely outputs 144-2 through 144-5) are connected directly to columns 132-3 through 132-6, respectively, of the first antenna array 130-1 by the feed network 150-1. Output 144-1 of Butler Matrix 140-1 is connected to a first level power divider 152-1, and the outputs of power divider 152-1 are coupled to columns 132-2 and 132-8, respectively, of the first antenna array 130-1. Output 144-6 of Butler Matrix 140-1 is connected to a first level power divider 152-2, and the outputs of power divider 152-2 are coupled to columns 132-1 and 132-7, respectively, of the first antenna array 130-1. RF connector ports 120-4 through 120-6 are connected to the second beamforming network 140-2, and the second beamforming network 140-2 is connected to the second antenna array 130-2 in the exact same fashion that the first beamforming network 140-1 is connected to the first antenna array 130-1, and hence description of these connections as shown in FIG. 3B will be omitted. It should be noted that only outputs 144-1 and 144-12 are explicitly numbered in FIG. 3B to simplify the drawing; it will be understood that the outputs to the beamforming networks 140-1, 140-2 are arranged sequentially in numerical order).

The above description describes the RF connector ports 120, beamforming networks 140 and first level power dividers 152 that are used to feed the first polarization dipole radiators 136-1 of the radiating elements 134 in the first and second antenna arrays 130-1, 130-2. As shown at the top of FIG. 3B, the same components are repeated to feed the second polarization dipole radiators 136-2 of the radiating elements 134 in the first and second antenna arrays 130-1, 130-2.

In FIG. 3B the radiating elements in columns 132-1 through 132-8 are drawn using solid lines to indicate that these radiating elements 134 are part of the first array 130-1, and the radiating elements in columns 132-9 through 132-16 are drawn using dotted lines to indicate that these radiating elements 134 are part of the second array 130-2.

FIG. 3C illustrates the connections between output 144-3 of beamforming networks 140-1, 140-3 and the radiating elements 134 of column 132-4 of antenna array 130-1. As shown in FIG. 3C, output 144-3 of Butler Matrix 140-1 is coupled to a first phase shifter assembly 156-1. Phase shifter assembly 156-1 includes a 1×4 power divider that divides RF signals input thereto into four sub-components, and also includes an adjustable phase shifter that is configured to impart a phase progression across the four sub-components in order to electronically change the tilt angles of the antenna beams generated by the radiating elements 134 in column 132-4. Each output 158 of phase shifter assembly 156-1 is coupled to a respective feed board 160. A pair of radiating elements 134 are mounted on each feed board 160. A power divider 162 is provided on each feed board 160 that subdivides RF signals input thereto into first and second sub-components that are passed to the respective first and second radiating elements 134 mounted on the feed board 160. As can be seen, the portion of feed network 150-1 depicted in FIG. 3C feeds output 144-3 of Butler Matrix 140-1 to the −45° dipole radiators 136-1 of the radiating elements 134 in column 132-4. A second phase shifter assembly 156-2 and four additional feed board power dividers 162 are provided that are used to similarly feed RF signals that are output from output 144-15 of Butler Matrix 140-3 to the +45° dipole radiators 136-2 of the radiating elements 134 in column 132-4. It will be appreciated that each of the other columns 132 of antenna arrays 130-1 and 130-2 are fed in the same manner as shown in FIG. 3C.

The base station antenna 100 operates as follows. The first beamforming network 140-1, the first feed network 150-1 and the first antenna array 130-1 are used to generate first through third −45° polarized antenna beams 138-1 through 138-3 that provide coverage to the three sub-sectors on the left side of the sector, and the second beamforming network 140-2, the second feed network 150-2 and the second antenna array 130-2 are used to generate fourth through sixth −45° polarized antenna beams 138-4 through 138-6 that provide coverage to the three sub-sectors on the right side of the sector. Similarly, the third beamforming network 140-3, the third feed network 150-3 and the first antenna array 130-1 are used to generate first through third +45° polarized antenna beams that also provide coverage to the three sub-sectors on the left side of the sector, and the fourth beamforming network 140-4, the fourth feed network 150-4 and the second antenna array 130-2 are used to generate fourth through sixth +45° polarized antenna beams that provide coverage to the three sub-sectors on the right side of the sector. FIG. 3D is a schematic diagram illustrating the first through sixth −45° polarized antenna beams 138-1 through 138-6. As can be seen, the six antenna beams split a 120° sector in the azimuth plane into six sub-sectors that are served by the six antenna beams 138. The first through sixth +45° polarized antenna beams will look identical to the first through sixth −45° polarized antenna beams, and hence the +45° antenna beams are not shown separately in FIG. 3D.

As discussed above, including a phase progression along the transmission lines connecting the outputs of each Butler Matrix 140 to the columns 132 of radiating elements 134 may reduce the degree of beam peak walking in one direction. As discussed above with reference to FIGS. 2A-2C, the beam peak walking of the left three beams results in the beam peaks for the left three antenna beams 138-1 through 138-3 generated in response to lower frequency signals pointing at larger azimuth angles than the beam peaks generated in response to higher frequency signals. Since beamforming networks 140-1 and 140-3 only generate the left three antenna beams 138-1 through 138-3, the phase progression can be used to decrease the amount of beam peak walking for the left three antenna beams 138-1 through 138-3 with no adverse impact on the right three antenna beams 138-4 through 138-6. Similarly, since beamforming networks 140-2 and 140-4 only generate the right three antenna beams 138-4 through 138-6, the phase progression can be used to decrease the amount of beam peak walking for the right three antenna beams 138-4 through 138-6 with no adverse impact on the left three antenna beams 138-1 through 138-3.

Thus, base station antenna 100 can significantly improve performance. However, the two antenna arrays 130-1, 130-2 included in base station antenna 100 have a total of sixteen columns 132 of radiating elements 134, which may significantly increase the width of base station antenna 100 as compared to conventional base station antenna 1, and which also increases the weight and cost of antenna 100. Additionally, antenna arrays 130-1 and 130-2 each only include eight columns 132 of radiating elements 134 as compared to the ten columns 32 of radiating elements 34 included in conventional base station antenna 1. However, the reduction in beam peak walking may be worth the increased cost, particularly in higher-order sector-splitting applications.

Figure 4:
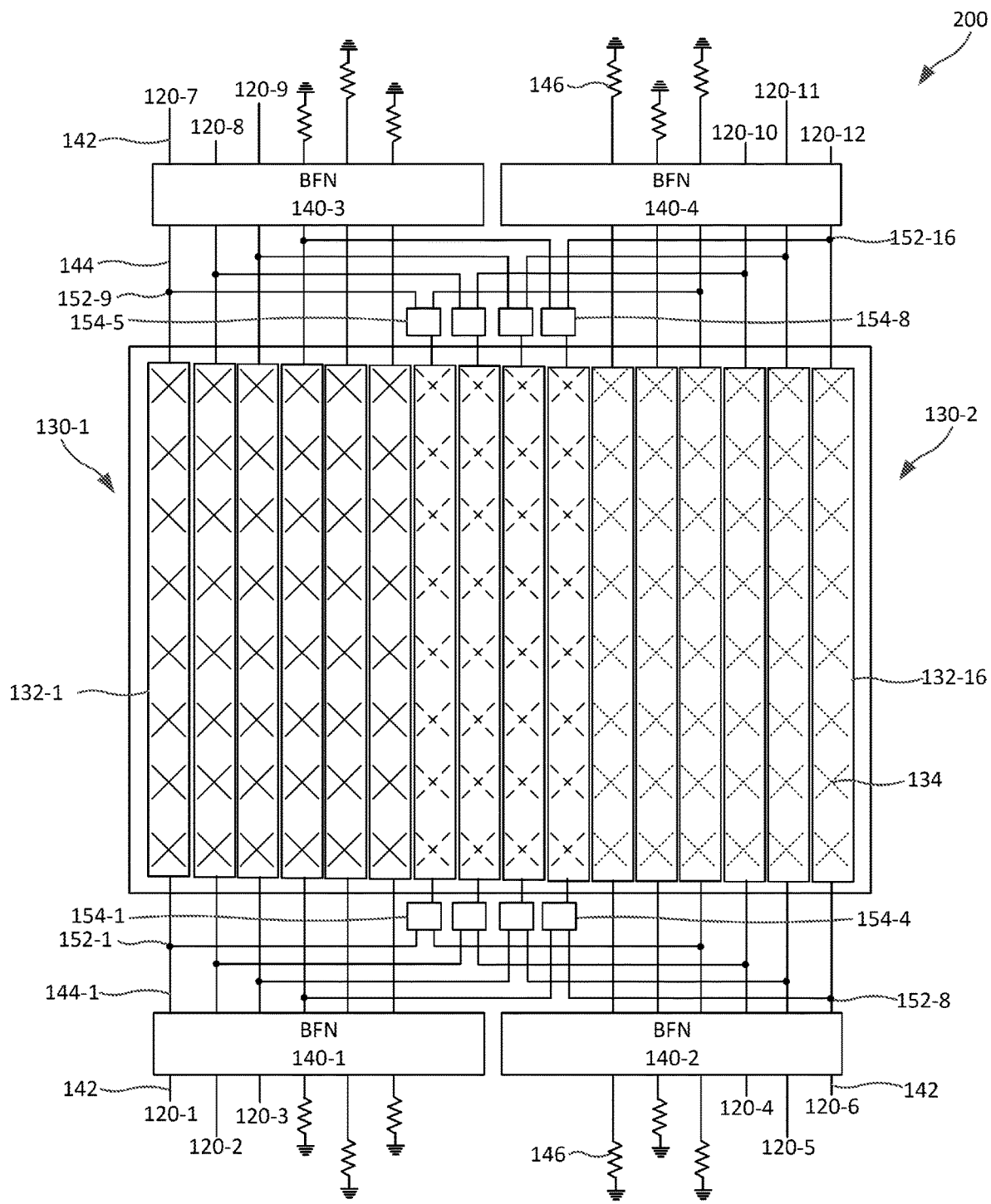
FIGS. 4-10 are schematic block diagrams illustrating the connections between the RF connector ports and the antenna arrays of base station antennas according to further embodiments of the present invention.

FIG. 4 is a schematic block diagram illustrating the connections between the RF connector ports and the antenna arrays of a base station antenna 200 according to further embodiments of the present invention. While FIG. 4 does not illustrate the connections between the outputs of the beamforming networks/first level power dividers and the radiating elements in each column of the antenna arrays, it will be understood that these connections may be the same as shown in FIG. 3C for the corresponding connections in base station antenna 100. This is also true with respect to base station antennas that are discussed below with respect to FIGS. 5-10, respectively. The base station antenna 200 may generate six antenna beams having narrower azimuth beamwidths as compared to the antenna beams generated by the base station antenna 100.

As can be seen, base station antenna 200 is similar to base station antenna 100, but includes eight additional first level power dividers 152, as well as eight second level power dividers 154 that are not present in base station antenna 100. The eight additional first level power dividers 152 allow each beamforming network 140 to be connected to ten columns 132 of radiating elements 134 instead of eight columns 132 as is the case with base station antenna 100. As a result, the azimuth beamwidths of the antenna beams generated by base station antenna 200 may be narrower than the azimuth beamwidths of the antenna beams 138 generated by base station antenna 100. Each second level power divider 154 is used to combine signals from two different beamforming networks 140 and to feed the combined signals to a respective column 132 of radiating elements 134. As shown in FIG. 4, the four middle columns 132-7 through 132-10 of radiating elements 134 each receive RF signals from two different beamforming networks 140, and hence are part of both the first antenna array 130-1 and the second antenna array 130-2. In other words, the four middle columns 132-7 through 132-10 of radiating elements 134 are shared across both antenna arrays 130 so that the number of columns 132 in each antenna array 130 can be increased without increasing the number of radiating elements 134. However, beam-to-beam isolation may be reduced, and additional power loss (and hence gain) is incurred in the second level power dividers 154. As base station antenna 200 may otherwise be identical to base station antenna 100, further description thereof will be omitted.

Figure 5:
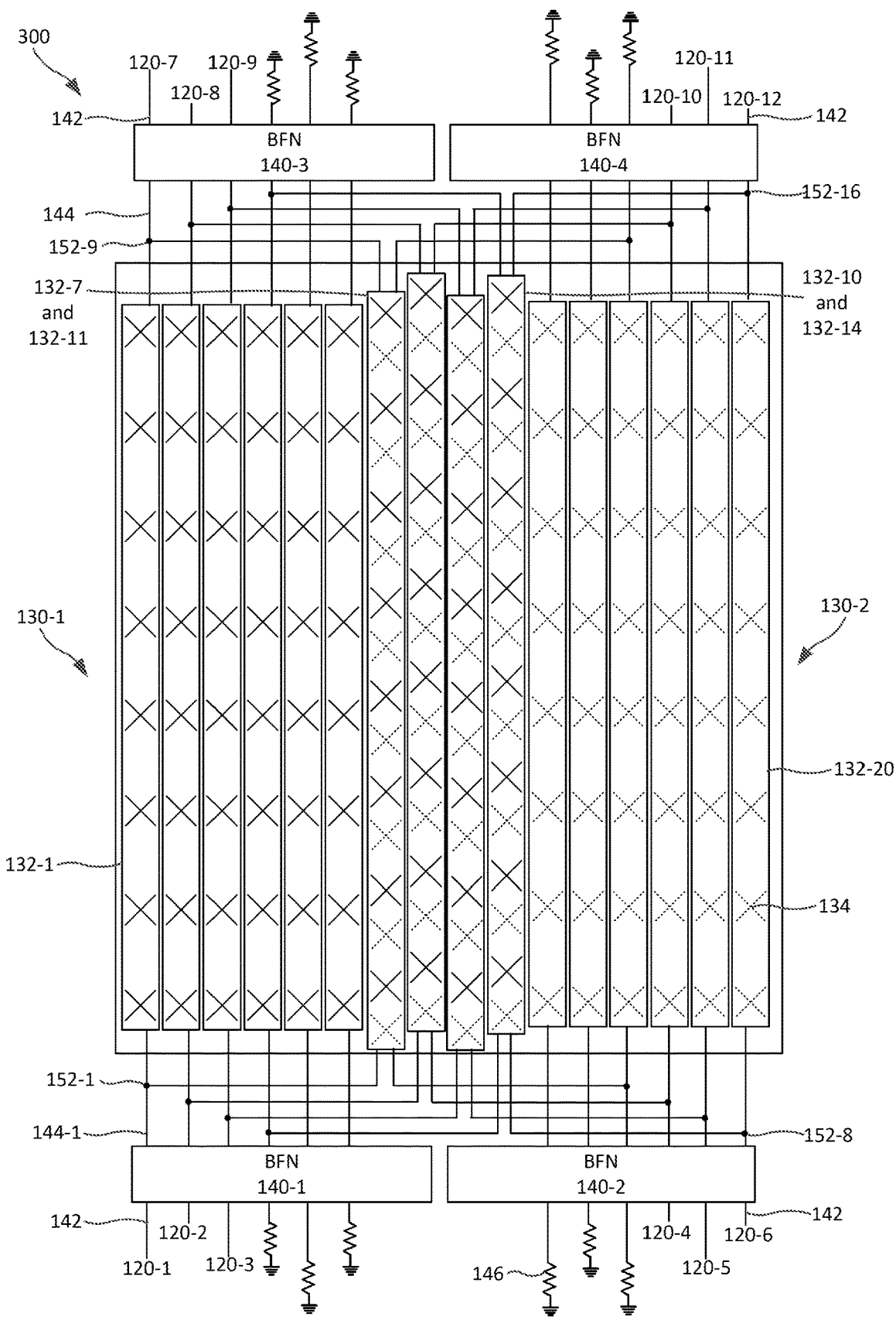
Figure 6:
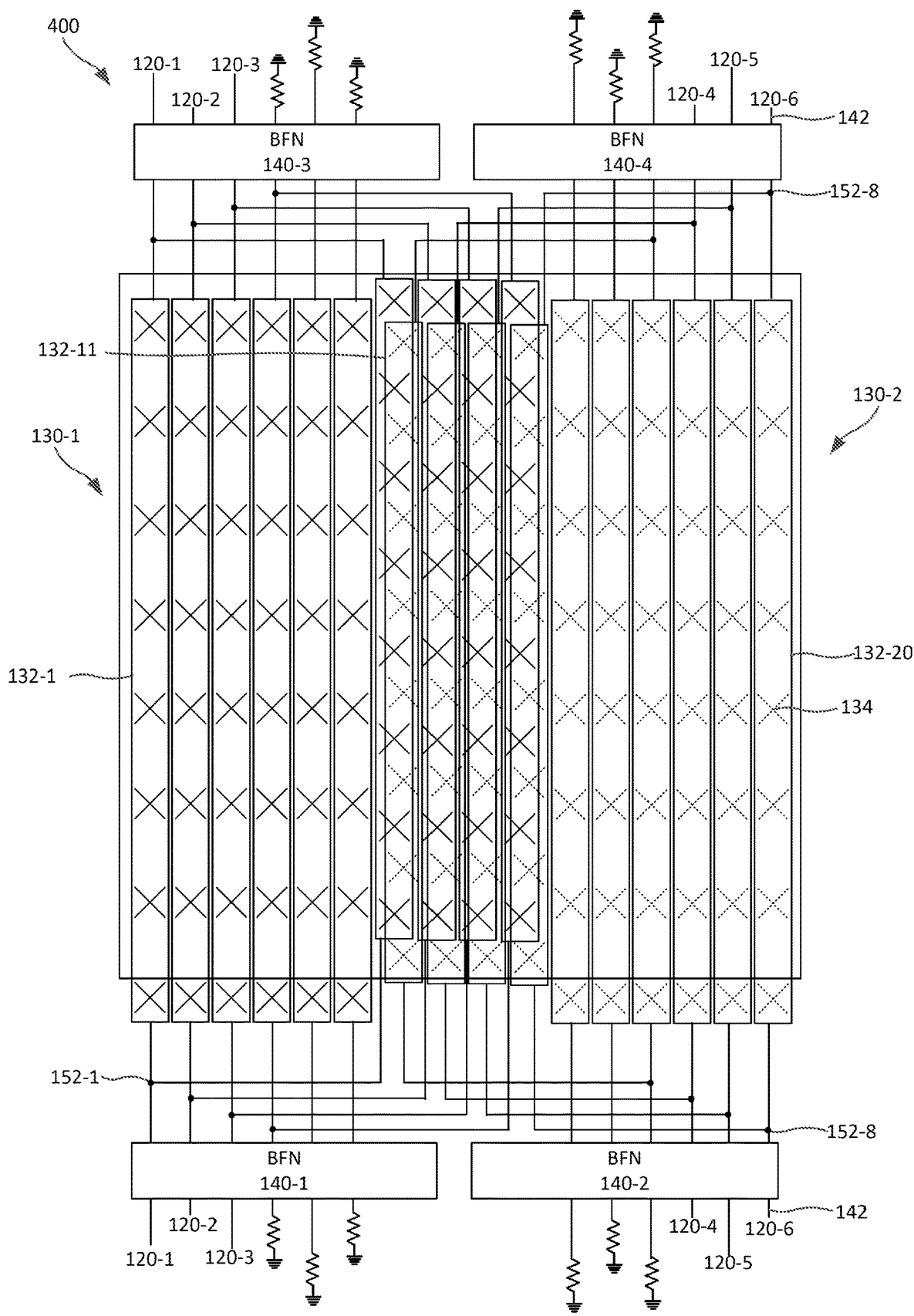

FIG. 5 is a schematic block diagram illustrating the connections between the RF connector ports and the antenna arrays of a base station antenna 300 according to further embodiments of the present invention. Base station antenna 300 is similar to base station antenna 200, but instead of sharing columns 132 of radiating elements across the first and second antenna arrays 130-1, 130-2, in base station antenna 300, each antenna array 130 includes ten columns 132 of radiating elements 134, none of which are shared with the other antenna array 130. The four columns 132-7 through 132-10 of antenna array 130-1 that are closest to the middle of the base station antenna 300 are interlaced with respective ones of the four columns 132-11 through 132-14 of antenna array 130-2 that are closest to the middle of the base station antenna 300. By "interlaced" it is meant that the radiating elements 134 in a column 132 of the first antenna array 130-1 are positioned relative to a column 132 of the second antenna array 130-2 so that so that a vertical axis exists that intersects the radiating elements 134 in both columns, and so that the radiating elements 134 in the two columns alternate as they extend with respect to the vertical axis. Thus, the radiating elements 134 in two interlaced columns 132 may be aligned along a vertical axis (as shown in FIG. 5), or the radiating elements 134 of the two columns 132 may be staggered a small amount in the horizontal direction (as shown in FIG. 6). It can also be seen that each of columns 132-8 through 132-10 of antenna array 130-1 is between (when viewed along a horizontal axis) a pair of columns 132 of antenna array 130-2. For example, column 132-8 of antenna array 130-1 is between columns 132-11 and 132-13 of antenna array 130-2, and column 132-10 of antenna array 130-1 is between columns 132-13 and 132-15 of antenna array 130-2. Similarly, each of columns 132-11 through 132-13 of antenna array 130-2 is between (when viewed along a horizontal axis) a pair of columns 132 of antenna array 130-1.

Since base station antenna 300 does not share columns 132 of radiating elements 134 between two antenna arrays 130, the second level power dividers 154 that are included in base station antenna 200 are not necessary in base station antenna 300. As base station antenna 300 may otherwise be identical to base station antenna 200, further description thereof will be omitted.

Figure 7:
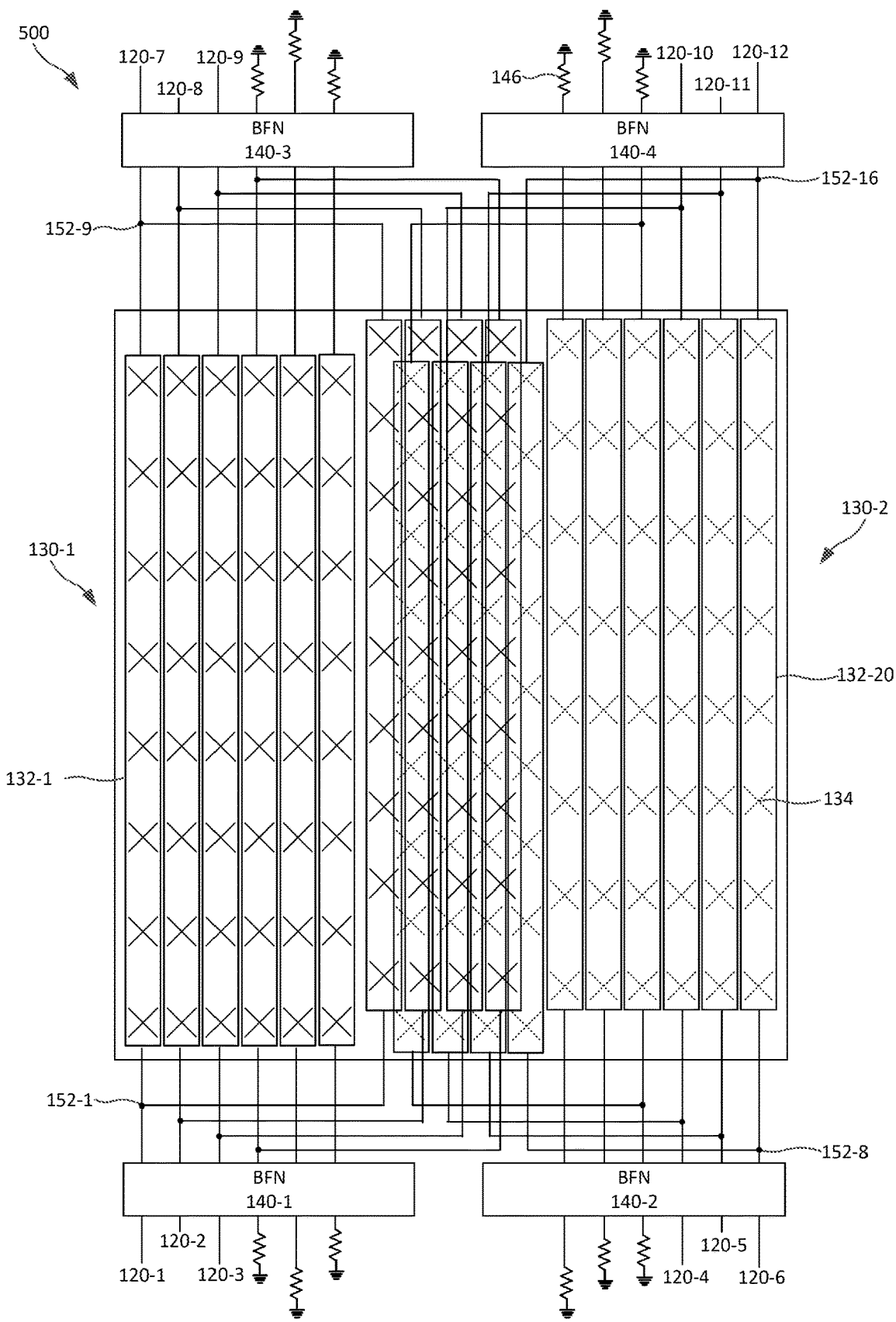

FIG. 6 is a schematic block diagram illustrating the connections between the RF connector ports and the antenna arrays of a base station antenna 400 according to further embodiments of the present invention. Base station antenna 400 is similar to base station antenna 300 in that each antenna array 130 includes ten columns 132 of radiating elements 134, none of which are shared with the other antenna array 130. However, the columns 132 in antenna arrays 130-1, 130-2 are arranged somewhat differently in base station antenna 400. Additionally, the four columns 132-7 through 132-10 of antenna array 130-1 that are closest to the middle of the base station antenna 400 are again interlaced with respective ones of the four columns 132-11 through 132-14 of antenna array 130-2 that are closest to the middle of the base station antenna 400. However, in base station antenna 300 columns 132-7 through 132-10 are horizontally aligned and vertically staggered with respect to columns 132-11 through 132-14, respectively, whereas in base station antenna 400 columns 132-7 through 132-10 are both horizontally staggered and vertically staggered with respect to columns 132-11 through 132-14, respectively. This design may provide a slight increase in isolation between antenna arrays 130-1 and 130-2. As base station antenna 400 may otherwise be identical to base station antenna 300, further description thereof will be omitted FIG. 7 is a schematic block diagram illustrating the connections between the RF connector ports and the antenna arrays of a base station antenna 500 according to further embodiments of the present invention. Base station antenna 500 is similar to base station antenna 400. However, in base station antenna 500, columns 132-7 through 132-10 of antenna array 130-1 of base station antenna 500 are horizontally staggered to a greater degree with respect to columns 132-11 through 132-14, respectively, and columns 132-1 through 132-16 of antenna array 130-1 are vertically staggered with respect to columns 132-15 through 132-20 of antenna array 130-2. As base station antenna 500 may otherwise be identical to base station antenna 400, further description thereof will be omitted.

Figure 8:
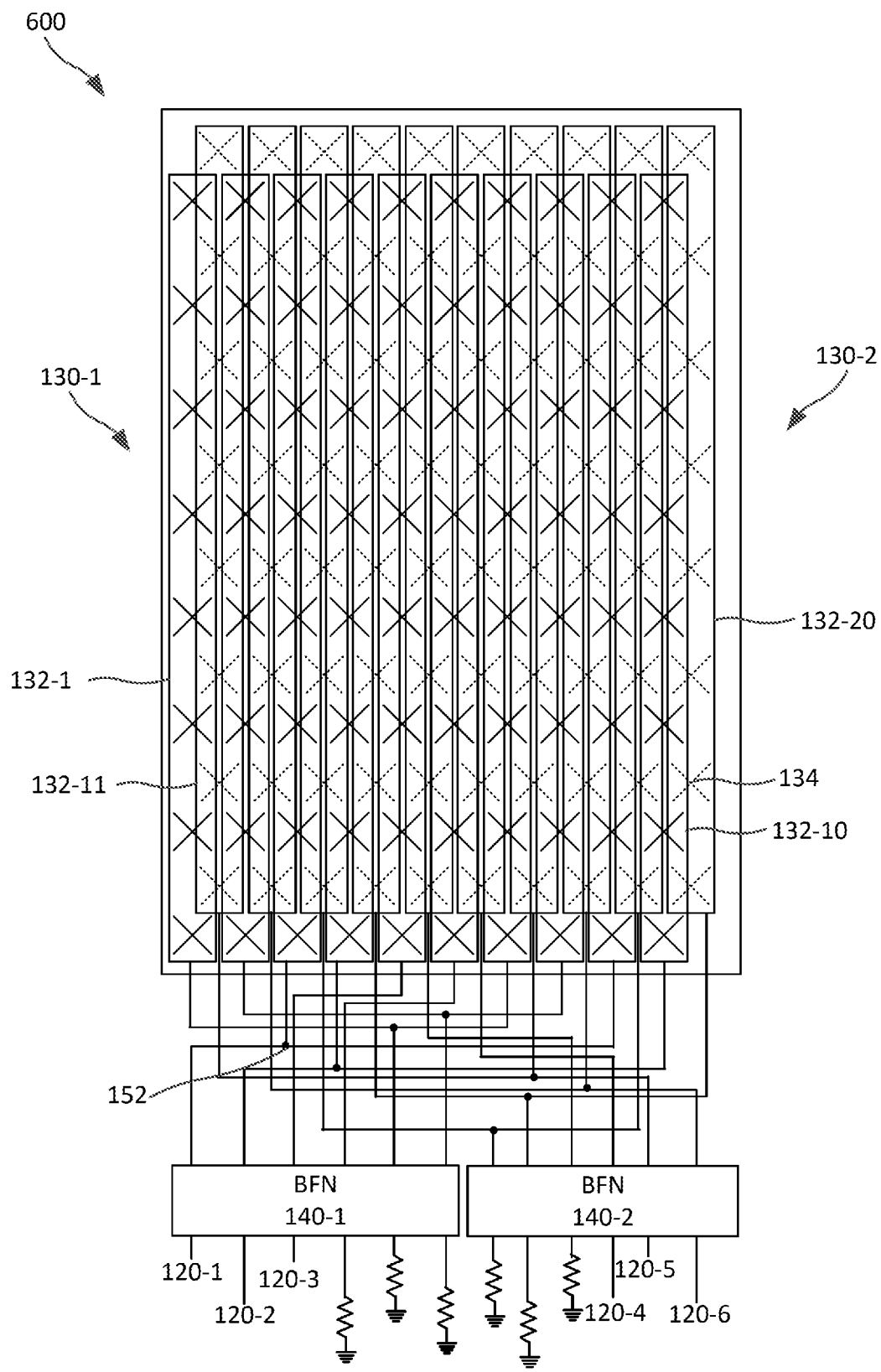

FIG. 8 is a schematic block diagram illustrating the connections between the RF connector ports and the antenna arrays of a base station antenna 600 according to further embodiments of the present invention. In FIG. 8, the RF ports 120, beamforming networks 140 and first level power dividers 152 are only shown for one polarization in order to simplify the drawing. It will be appreciated that RF ports 120, beamforming networks 140 and first level power dividers 152 are repeated for the second polarization, in the same manner shown in FIGS. 3B and 4-7. The RF ports 120, beamforming networks 140 and first level power dividers 152 for the second polarization are also omitted in similar fashion from FIGS. 9 and 10 below to simplify those drawings. Base station antenna 600 differs from the other base station antennas discussed above in that base station antenna 600 interlaces all ten columns 132-1 through 132-10 of antenna array 130-1 with the ten columns 132-11 through 132-20 of antenna array 130-2. Consequently, the average spacing between adjacent columns 132 is reduced, resulting in a narrower base station antenna. The closer average spacing between columns 132 acts to increase coupling between radiating elements 134 in adjacent columns 132, which can degrade some performance parameters, such as cross-polarization discrimination. Thus, base station antenna 600 illustrates how antenna size and performance can be traded off to suit the needs of various applications.

Figure 9:
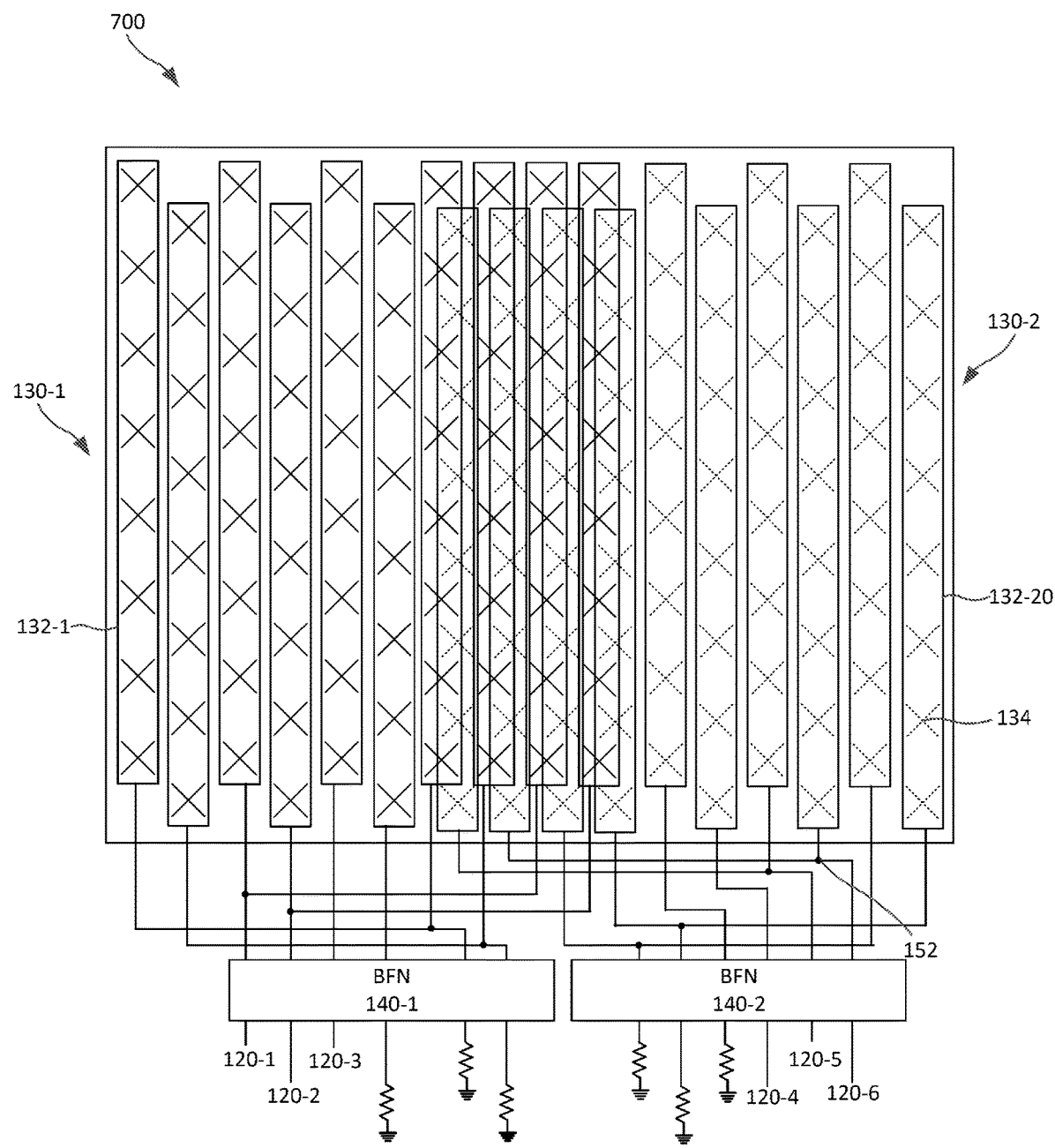

FIG. 9 is a schematic block diagram illustrating the connections between the RF connector ports and the antenna arrays of a base station antenna 700 according to further embodiments of the present invention. In FIG. 9, the RF ports 120, beamforming networks 140 and first level power dividers 152 are only shown for one polarization in order to simplify the drawing. Base station antenna 700 is similar to base station antenna 400. However, in base station antenna 700, columns 132-1 through 132-6 of antenna array 130-1 are staggered vertically with respect to adjacent columns, as are columns 132-15 through 132-20 of antenna array 130-2. This may increase isolation between radiating elements 134 in adjacent columns 132, which can improve various performance parameters, such as cross-polarization discrimination.

Figure 10:
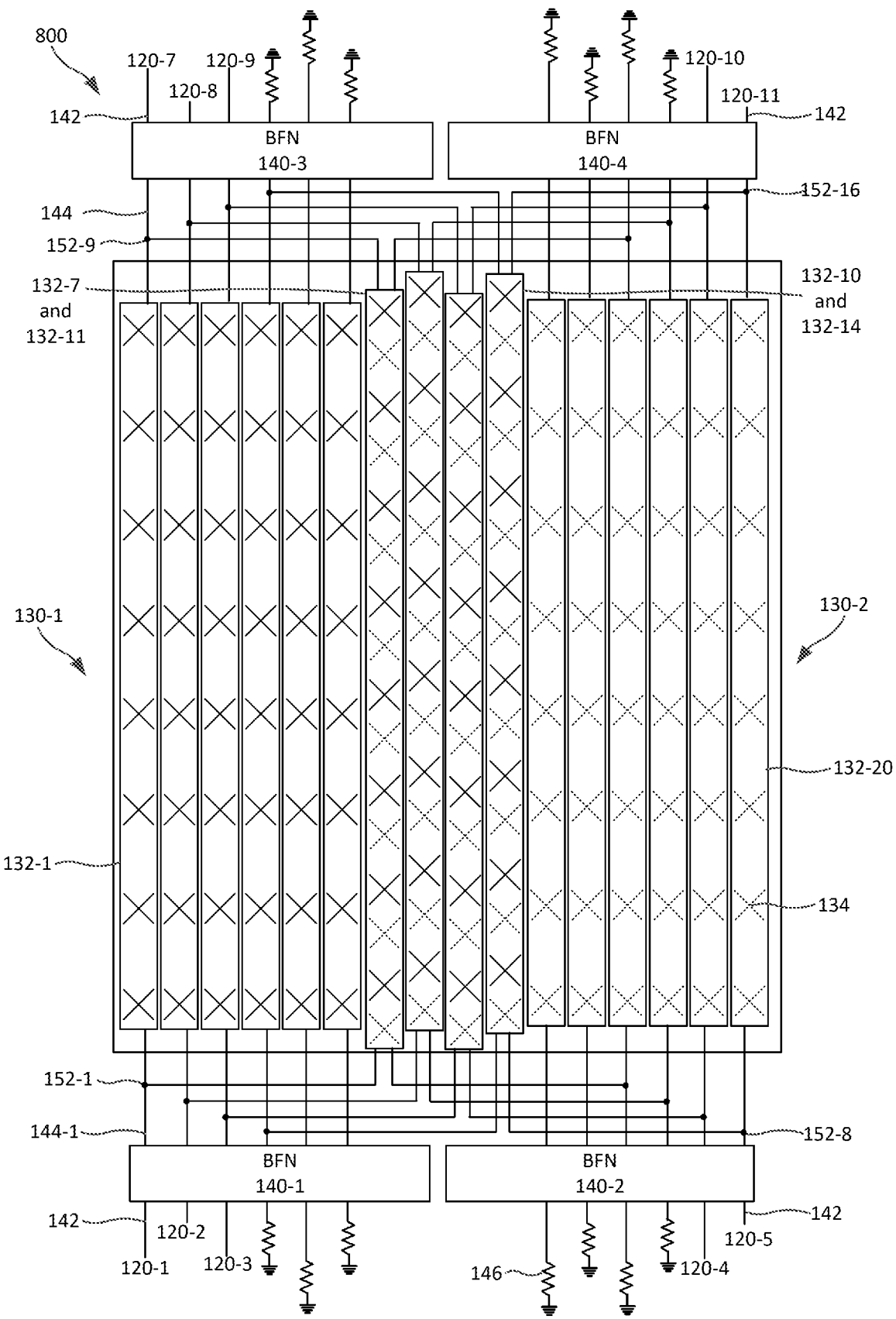

FIG. 10 is a schematic block diagram illustrating the connections between the RF connector ports and the antenna arrays of a base station antenna 800 according to further embodiments of the present invention. The base station antenna 800 of FIG. 10 is a five beam (per polarization) sector splitting antenna, and hence generates one less beam per polarization than the base station antennas of FIGS. 3A-9 discussed above. As shown, the connections between the RF connector ports and the antenna arrays are very similar to the connections in the previously described embodiments, with the major difference being that four ports on beamforming networks 140-2 and 140-4 are coupled to matched terminations instead of only three as in the other embodiments described herein.

Figure 11:
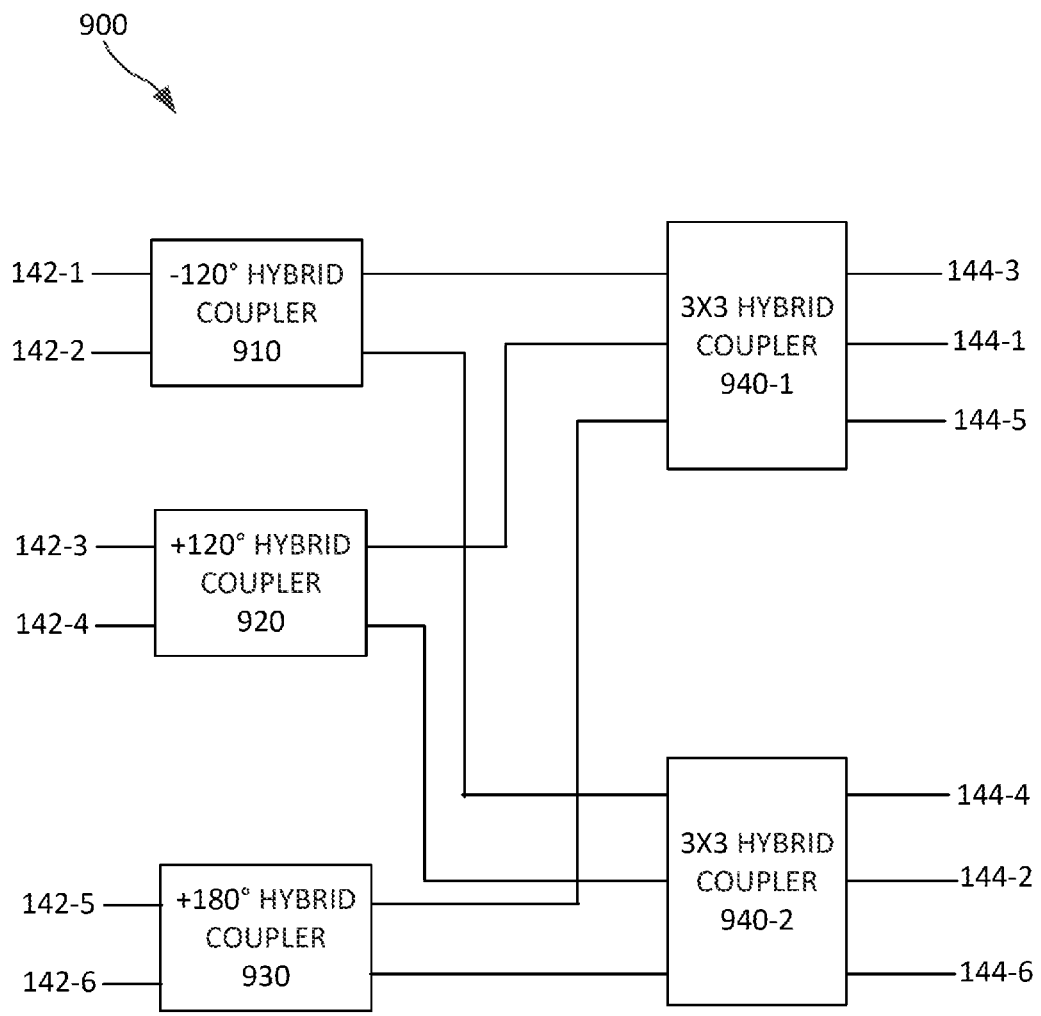
FIG. 11 is a schematic block diagram of a 6×6 beamforming network that may be used in the base station antennas according to certain embodiments of the present invention.

FIG. 11 is a schematic block diagram of a 6×6 beamforming network 900 that may be used in the base station antennas according to embodiments of the present invention. As shown in FIG. 11, the beamforming network 900 includes six inputs which are labeled 142-1 through 142-6 and six outputs which are labeled 144-1 through 144-6. The first and second inputs 142-1, 142-2 are coupled to a –120° hybrid coupler 910, the third and fourth inputs 142-3, 142-4 are coupled to a +120° hybrid coupler 920, and the fifth and sixth inputs 142-5, 142-6 are coupled to a +180° hybrid coupler 930. The first output of the –120° hybrid coupler 910 is coupled to the first input of a first 3×3 hybrid coupler 940-1 and the second output of the –120° hybrid coupler 910 is coupled to the first input of a second 3×3 hybrid coupler 940-2. The first output of the +120° hybrid coupler 920 is coupled to the second input of the first 3×3 hybrid coupler 940-1 and the second output of the +120° hybrid coupler 920 is coupled to the second input of the second 3×3 hybrid coupler 940-2. The first output of the +180° hybrid coupler 930 is coupled to the third input of the first 3×3 hybrid coupler 940-1 and the second output of the +180° hybrid coupler 930 is coupled to the third input of the second 3×3 hybrid coupler 940-2. The outputs of the first and second 3×3 hybrid couplers 940-1, 940-2 are numbered to show how they correspond to the outputs 144-1 through 144-6 of the beamforming network 900.

As described above, phase compensation may be applied to reduce beam peak walking in the base station antennas according to embodiments of the present invention. In example, embodiments, such phase compensation may be accomplished by adding different configurations of microstrip stubs to microstrip transmission lines that connect the beamforming networks to the antenna arrays in the base station antennas according to embodiments of the present invention. The different configurations of microstrip stubs may be selected to exhibit different phase slope versus frequency characteristics, which allows the output phase for each microstrip transmission line as a function of frequency to be optimized to reduce beam peak walking.

Figure 12:
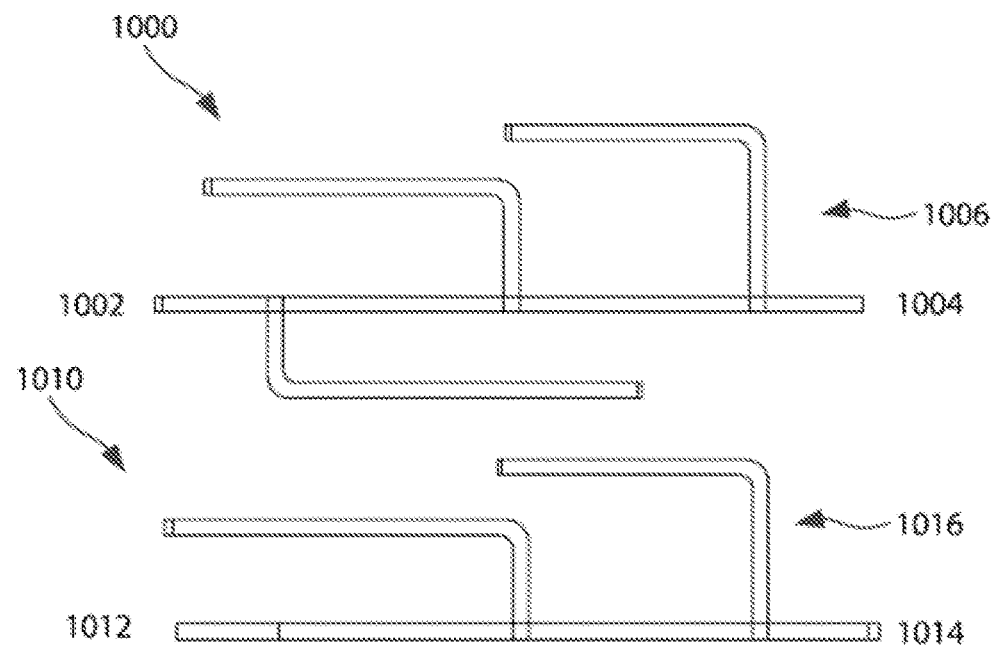
FIG. 12 is a schematic diagram illustrating a technique for applying phase compensation in the base station antennas according to embodiments of the present invention.
Figure 12:
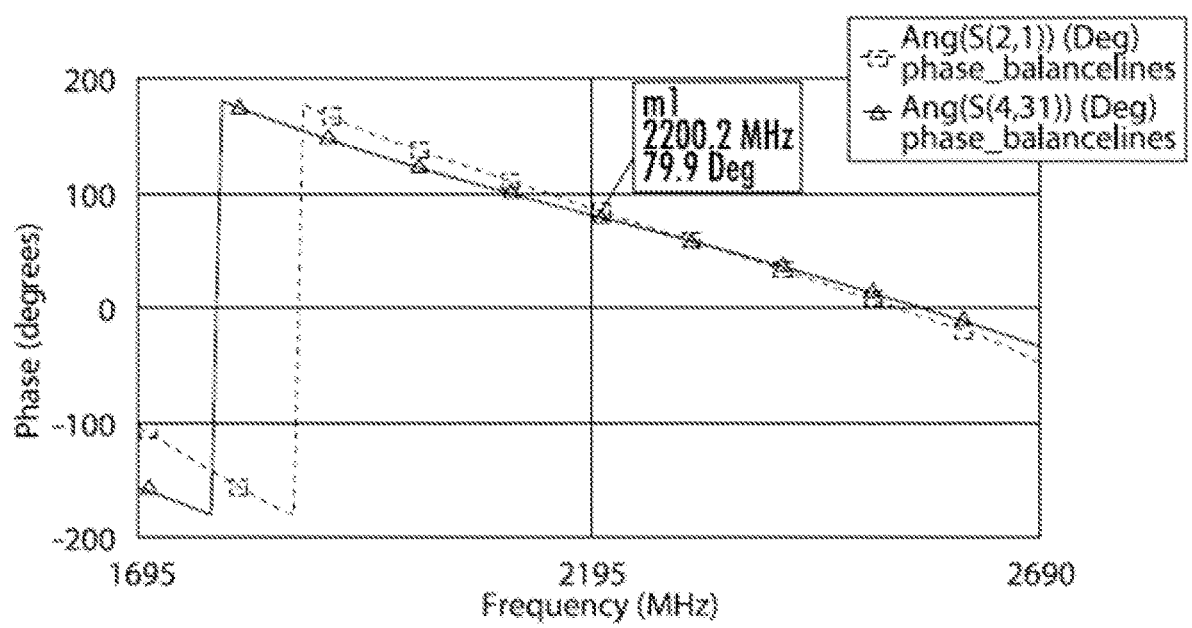

FIG. 12 is a schematic diagram illustrating such phase compensation may be achieved. In particular, a pair of microstrip transmission lines 1000, 1010 are shown in FIG. 12. Transmission line 1000 includes an input 1002 (which may be connected to a beamforming network), an output 1004 (which may be coupled to a column of radiating elements), and a plurality of tuning stubs 1006. Similarly, transmission line 1010 includes an input 1012 (which may be connected to a beamforming network), an output 1014 (which may be coupled to a column of radiating elements), and a plurality of tuning stubs 1016. The tuning stubs 1006, 1016 have different configurations. The graph in FIG. 12 illustrates the phase of RF signals that are input to the respective transmission lines 1000, 1010 at the respective outputs of transmission lines 1000, 1010 as a function of frequency. As shown in the graph, the slopes of the two responses differ (and hence the lines on the graph cross), which allows a designer to optimize the phase output as a function of frequency in order to reduce beam peak walking.

While the above-described embodiments are described with respect to splitting a 120° sector of a traditional three-sector base station, it will be appreciated that embodiments of the present invention are not limited thereto. For example, in other embodiments, the sector-splitting base station antennas may be used to split a sector of a four-sector base station, used in applications that provide coverage along relatively straight highways, tunnels, bridges, railways or the like, or used in specialized applications such as stadiums or other large venues.

It will be appreciated that many modifications may be made to the above example embodiments without departing from the scope pf the present invention. As one example, each of the embodiments discussed above included two beamforming networks per polarization. Embodiments of the present invention are not limited thereto. For example, in other embodiments, three or more beamforming networks may be provided per polarization. As one example, a six-beam (per polarization) sector-splitting antenna could include three beamforming networks which are each coupled to a respective pair of RF ports (per polarization). Each beamforming network may be coupled to a respective antenna array. The antenna arrays may or may not share columns, and may include interlace columns.

The base station antennas described above include "columns" of radiating elements. Most typically, each "column" may comprise a vertically-oriented linear array of radiating elements where the radiating elements extend along a vertical axis. However, it will be appreciated that in some cases the columns may be so-called "staggered" linear arrays of radiating elements in which some of the radiating elements are offset horizontally from other of the radiating elements by a small amount. As explained in U.S. Provisional Patent Application Ser. No. 62/722,238, filed Aug. 24, 2018, the entire content of which is incorporated herein by reference, such staggered linear arrays may be included in base station antennas to, for example, improve the stability of the azimuth beamwidth across the frequency band of operation.

It will be appreciated that the present specification only describes a few example embodiments of the present invention and that the techniques described herein have applicability beyond the example embodiments described above. It should also be noted that the antennas according to embodiments of the present invention may be used in applications other than sector-splitting such as, for example, in venues such as stadiums, coliseums, convention centers and the like. In such applications, the multiple beams are more usually configured to cover a 60°-90° sector.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A sector-splitting base station antenna, comprising:
   a plurality of radio frequency ("RF") ports;
   a plurality of columns of radiating elements;
   a first beamforming network that is coupled between a first subset of the RF ports and a first antenna array that comprises a first subset of the columns of radiating elements; and
   a second beamforming network that is coupled between a second subset of the RF ports and a second antenna array that comprises a second subset of the columns of radiating elements,
   wherein the first beamforming network and the first antenna array are configured to generate a first plurality of antenna beams that point in different directions in an azimuth plane to provide coverage to a first side of a sector of a cell of a cellular communications system but not to a second side of the sector, and
   wherein the second beamforming network and the second antenna array are configured to generate a second plurality of antenna beams that point in different directions in the azimuth plane to provide coverage to the second side of the sector but not to the first side of the sector.

2. The sector-splitting base station antenna of claim 1, wherein none of the columns of radiating elements in the first subset of the columns of radiating elements are also in the second subset of the columns of radiating elements.

3. The sector-splitting base station antenna of claim 1, wherein some, but not all, of the columns of radiating elements in the first subset of the columns of radiating elements comprise shared columns of radiating elements that are also in the second subset of the columns of radiating elements.

4. The sector-splitting base station antenna of claim 3, wherein the shared columns of radiating elements are in between the columns of radiating elements in the first subset of the columns of radiating elements that are not in the second subset of the columns of radiating elements and the columns of radiating elements in the second subset of the columns of radiating elements that are not in the first subset of the columns of radiating elements.

5. The sector-splitting base station antenna of claim 1, wherein the first beamforming network comprises a first Butler Matrix that has six inputs and six outputs and the second beamforming network comprises a second Butler Matrix that has six inputs and six outputs.

6. The sector-splitting base station antenna of claim 5, wherein at least some of the outputs of the first Butler Matrix are coupled to more than one of the columns of radiating elements.

7. The sector-splitting base station antenna of claim 1, wherein at least two of the columns of radiating elements in the second subset of the columns of radiating elements are positioned within a footprint of the first antenna array.

8. The sector-splitting base station antenna of claim 1, wherein some, but not all, of the columns of radiating elements in the first subset of the columns of radiating elements are interlaced with respective ones of the columns of radiating elements in the second subset of the columns of radiating elements.

9. The sector-splitting base station antenna of claim 1, wherein the sector-splitting base station antenna is configured to split the sector into a plurality of sub-sectors in the azimuth plane, and wherein the first plurality of antenna beams provide coverage to a first half of the sub-sectors and the second plurality of antenna beams provide coverage to a second half of the sub-sectors that is different from the first half.

10. A sector-splitting base station antenna, comprising:
    a plurality of radio frequency ("RF") ports;

a plurality of columns of radiating elements,
a first beamforming network that includes a plurality of inputs and a plurality of outputs; and
a second beamforming network that includes a plurality of inputs and a plurality of outputs,
wherein some of the inputs of the first beamforming network are coupled to respective ones of a first subset of the RF ports and a remainder of the inputs are coupled to respective matched terminations, and the outputs of the first beamforming network are coupled to a first subset of the columns of radiating elements.

11. The sector-splitting base station antenna of claim 10, wherein some of the inputs of the second beamforming network are coupled to respective ones of a second subset of the RF ports and a remainder of the inputs are coupled to respective matched terminations, and the outputs of the second beamforming network are coupled to a second subset of the columns of radiating elements.

12. The sector-splitting base station antenna of claim 11, wherein some, but not all, of the columns of radiating elements in the first subset of the columns of radiating elements comprise shared columns of radiating elements that are also in the second subset of the columns of radiating elements.

13. The sector-splitting base station antenna of claim 10, wherein the sector-splitting base station antenna is configured to split a sector of a cell of a cellular communications system into a plurality of sub-sectors in the azimuth plane, and wherein the first beamforming network is configured to generate a first plurality of antenna beams that provide coverage to a first half of the sub-sectors that form a left side of the sector and the second beamforming network is configured to generate a second plurality of antenna beams that provide coverage to a second half of the sub-sectors that form a right side of the sector.

14. A sector-splitting base station antenna, comprising:
a plurality of radio frequency ("RF") ports;
a first antenna array that includes a plurality of first columns of radiating elements;
a second antenna array that includes a plurality of second columns of radiating elements;
a first beamforming network that is coupled between a first subset of the RF ports and the first antenna array; and
a second beamforming network that is coupled between a second subset of the RF ports and the second antenna array,
wherein at least some of the first columns of radiating elements are within a footprint of the second antenna array, and at least some of the second columns of radiating elements are within a footprint of the second antenna array.

15. The sector-splitting base station antenna of claim 14, wherein the four rightmost of the first columns are interlaced with the four leftmost of the second columns.

16. The sector-splitting base station antenna of claim 14, wherein all of the first columns are interlaced with respective ones of the second columns.

17. The sector-splitting base station antenna of claim 16, wherein each of the first columns is vertically aligned with a respective one of the second columns.

18. The sector-splitting base station antenna of claim 16, wherein each of the first columns is horizontally staggered with respect to the respective one of the second columns with which it is interlaced.

19. The sector-splitting base station antenna of claim 14, wherein the first beamforming network comprises a first Butler Matrix and the second beamforming network comprises a second Butler Matrix that has six inputs and six outputs.

20. The sector-splitting base station antenna of claim 19, wherein at least some of the outputs of the first Butler Matrix are coupled to more than one of the first columns of radiating elements, and at least some of the outputs of the second Butler Matrix are coupled to more than one of the second columns of radiating elements.

21. The sector-splitting base station antenna of claim 19, wherein the sector-splitting base station antenna is configured to split a sector of a cell of a cellular communication system into a plurality of sub-sectors in the azimuth plane, and wherein the first Butler Matrix and the first antenna array are configured to generate a first plurality of antenna beams that provide coverage to a first half of the sub-sectors and the second Butler Matrix and the second antenna array are configured to generate a second plurality of antenna beams that provide coverage to a remaining half of the sub-sectors.

* * * * *